(12) United States Patent  
Rai

(10) Patent No.: US 12,482,050 B2
(45) Date of Patent: Nov. 25, 2025

(54) ONBOARD VEHICLE SHARING SERVICE

(71) Applicant: Toyota InfoTechnology Center USA, Inc., Mountain View, CA (US)

(72) Inventor: Vinuth Rai, Mountain View, CA (US)

( * ) Notice: Subject to any disclaimer, the term of this patent is extended or adjusted under 35 U.S.C. 154(b) by 8 days.

(21) Appl. No.: 17/545,575

(22) Filed: Dec. 8, 2021

(65) Prior Publication Data
US 2022/0092719 A1  Mar. 24, 2022

Related U.S. Application Data

(63) Continuation of application No. 14/570,488, filed on Dec. 15, 2014, now abandoned.

(51) Int. Cl.
| | |
|---|---|
| *G06Q 50/40* | (2024.01) |
| *G06F 3/0482* | (2013.01) |
| *G06F 3/04847* | (2022.01) |
| *G06F 3/0488* | (2022.01) |
| *G06Q 50/00* | (2012.01) |
| *G08G 1/0962* | (2006.01) |

(Continued)

(52) U.S. Cl.
CPC .......... *G06Q 50/40* (2024.01); *G06F 3/0482* (2013.01); *G06F 3/04847* (2013.01); *G06F 3/0488* (2013.01); *G06Q 50/01* (2013.01); *G08G 1/0962* (2013.01); *H04L 67/12* (2013.01); *H04L 67/306* (2013.01); *H04L 67/34* (2013.01)

(58) Field of Classification Search
CPC ...... G06Q 50/40; G06Q 50/01; G06F 3/0482; G06F 3/04847; G06F 3/0488
USPC ............................................ 705/13, 7.11, 1.1
See application file for complete search history.

(56) References Cited

U.S. PATENT DOCUMENTS

| | | | |
|---|---|---|---|
| 7,047,888 B2 | 5/2006 | Richards | |
| 9,139,091 B1 * | 9/2015 | Penilla | ..................... B60L 1/02 |

(Continued)

FOREIGN PATENT DOCUMENTS

| | | | | |
|---|---|---|---|---|
| CA | 2708727 A1 * | 1/2011 | ............. | G06Q 30/02 |
| DE | 112005001747 T5 * | 6/2007 | ............. | H04L 67/18 |

(Continued)

OTHER PUBLICATIONS

Morency, Catherine, "the Ambivalence of Ridesharing," Transportation (Dordrecht) 34.2, 2007, pp. 239-253.

(Continued)

*Primary Examiner* — Akiba K Robinson
(74) *Attorney, Agent, or Firm* — Burbage Law, P.C.; Jon-Michael Burbage

(57) ABSTRACT

The disclosure includes a system, method and graphical user interfaces ("GUIs") for providing an onboard vehicle sharing system. The system may include an onboard vehicle sharing system installed in a vehicle. The onboard vehicle sharing system may include a processor, a touchscreen installed in the vehicle and a non-transitory computer-readable medium communicatively coupled to the touchscreen and the processor. The non-transitory computer-readable medium may store computer instructions that are executable by the processor to perform or control performance of operations for providing an onboard vehicle sharing service. The operations may include receiving an input to the touchscreen indicating a sharing mode for the vehicle. The sharing mode may include a Share Ride mode or a Share Vehicle mode.

20 Claims, 20 Drawing Sheets

(51) Int. Cl.
*H04L 67/00* (2022.01)
*H04L 67/12* (2022.01)
*H04L 67/306* (2022.01)

(56) References Cited

U.S. PATENT DOCUMENTS

| | | |
|---|---|---|
| 2006/0293937 A1 | 12/2006 | Sohm et al. |
| 2011/0153629 A1* | 6/2011 | Lehmann ............... G06Q 10/06 707/E17.014 |
| 2013/0030645 A1* | 1/2013 | Divine ................... B60K 35/00 709/217 |
| 2014/0222298 A1* | 8/2014 | Gurin ..................... G06Q 10/08 701/49 |
| 2014/0343796 A1 | 11/2014 | Abuelsaad et al. |
| 2015/0088337 A1* | 3/2015 | Toohy ............... B60W 50/0098 701/1 |
| 2015/0277114 A1 | 10/2015 | Westra et al. |
| 2015/0379782 A1 | 12/2015 | Nakagawa |
| 2016/0034845 A1* | 2/2016 | Hiyama ............. G06Q 30/0633 705/7.15 |
| 2016/0103980 A1 | 4/2016 | Ricci et al. |
| 2016/0132792 A1 | 5/2016 | Rosnow |
| 2016/0358214 A1* | 12/2016 | Shalunov ........... G06Q 30/0639 |
| 2017/0008451 A1* | 1/2017 | Stanfield ................. B60Q 1/50 |

FOREIGN PATENT DOCUMENTS

| | | | | |
|---|---|---|---|---|
| EP | 2151355 A1 | * | 2/2010 | ........... B60R 16/037 |
| JP | 2004118531 A | * | 4/2004 | |
| JP | 2009217759 A | * | 9/2009 | |

OTHER PUBLICATIONS

Huang, Yan et al., "Large Scale Real-Time Ridesharing with Service Guarantee on Road Networks," Proceedings of the VLDB Endowment 7.14, 2014, pp. 2017-2028.
USPTO, Restriction Requirement for U.S. Appl. No. 14/570,488, Oct. 31, 2017, 5 pages.
USPTO, Non-final Office Action for U.S. Appl. No. 14/570,488, Apr. 4, 2018, 15 pages.
USPTO, Final Office Action for U.S. Appl. No. 14/570,488, Oct. 25, 2018, 18 pages.
USPTO, Non-final Office Action for U.S. Appl. No. 14/570,488, May 1, 2019, 19 pages.
USPTO, Final Office Action for U.S. Appl. No. 14/570,488, Nov. 8, 2019, 20 pages.
USPTO, Non-final Office Action for U.S. Appl. No. 14/570,488, Jul. 8, 2020, 21 pages.
USPTO, Non-final Office Action for U.S. Appl. No. 14/570,488, Dec. 15, 2020, 21 pages.
USPTO, Final Office Action for U.S. Appl. No. 14/570,488, May 21, 2021, 22 pages.
USPTO, Notice of Allowance for U.S. Appl. No. 14/570,488, Sep. 22, 2021, 16 pages.

* cited by examiner

800

1100

ONBOARD VEHICLE SHARING SERVICE

CROSS-REFERENCE TO RELATED APPLICATIONS

This patent application is a continuation of U.S. patent application Ser. No. 14/570,488, filed Dec. 15, 2014 and titled ONBOARD VEHICLE SHARING SERVICE, the entirety of which is hereby incorporated by reference.

BACKGROUND

The specification relates to providing an onboard vehicle sharing service.

The current paradigm is for users to have a private vehicle. However, not all users may need a private vehicle.

SUMMARY

According to one innovative aspect of the subject matter described in this disclosure, the disclosure may include a system, method and one or more graphical user interfaces (GUIs) for providing an onboard vehicle sharing system. The system may include an onboard vehicle sharing system installed in a vehicle. The onboard vehicle sharing system may include a processor, a touchscreen installed in the vehicle and a non-transitory computer-readable medium communicatively coupled to the touchscreen and the processor. The non-transitory computer-readable medium may store computer instructions that are executable by the processor to perform or control performance of operations for providing an onboard vehicle sharing service. The operations may include receiving a first input to the touchscreen indicating a share mode for the vehicle. The vehicle mode may include a Share Ride mode or a Share Vehicle mode.

Responsive to the vehicle mode including Share Ride mode, the operations may include receiving ride share data associated with the two or more ride sharing services. The ride-share data may describe a set of customers for sharing a ride in the vehicle in exchange for a payment.

Responsive to the vehicle mode including Share Vehicle mode, the operations may include receiving a second input to the touchscreen including a time slot describing a period of time during which the vehicle is available for one or more vehicle sharing services. Responsive to the first and second input, the operations may include transmitting data indicating that the vehicle is available for the one or more vehicle sharing services and the time slot during which the vehicle is available.

In general, another innovative aspect of the subject matter described in this disclosure may be embodied in methods that include: identifying, by a processor-based device programmed to do the identification, that a client associated with a user is paired with an onboard wireless communication system of a vehicle; and responsive to the pairing of the client with the onboard wireless communication system of the vehicle, determining that the user associated with the client is present at the vehicle. The pairing may include the client pairing with the onboard wireless communication system via Bluetooth® or Bluetooth® Low Energy (Bluetooth® LE). The method may further include configuring an element of the vehicle to be personalized for the user based on the determination that the user is present at the vehicle. The element of the vehicle that is configured for the user may include a heads-up display unit. For example, an outward facing display of the heads-up display unit may display a greeting for the user.

Other aspects include corresponding methods, systems, apparatus, and computer program products for these and other innovative aspects.

The disclosure is particularly advantageous in a number of respects. For example, the disclosure may describe a system and method to provide the vehicle with onboard systems, methods and GUIs to enable a user of the vehicle to share the vehicle with other people.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
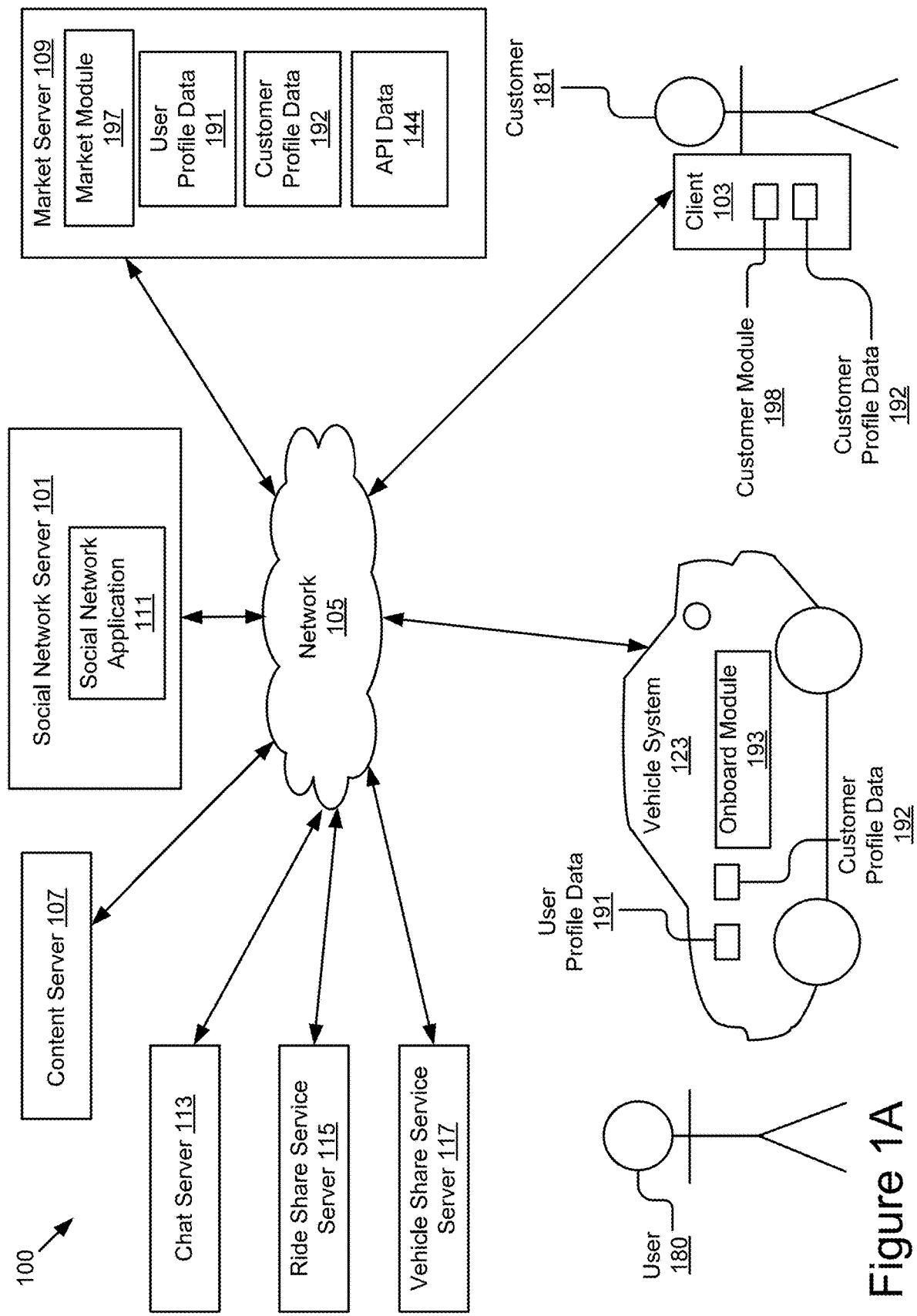
FIG. 1A is a block diagram illustrating an example system for providing an onboard vehicle sharing service.

This disclosure includes an onboard vehicle sharing system, method and graphical user interfaces (GUIs) that enable vehicle owners or lessees to share their vehicles with other people. The onboard vehicle sharing service may be referred to as a "Ready-to-Share service" since the vehicle may come from the factory "Ready-to-Share." Described at a high level, the Ready-to-Share service may include a marketplace for vehicle and ride sharing. Users may use an intuitive GUI such as the one depicted in FIG. 1B to place their vehicle in one of three modes: (1) Private; (2) Share Ride; and (3) Share Vehicle. These three modes are explained in more detail below. The GUIs described herein may be viewable via a touchscreen of the vehicle and include graphical elements which are configured to be selectable by a user or a customer via touch or gestures.

When in Private mode, the vehicle may function as a private vehicle.

When in Share Ride mode, the vehicle may be viewable by customers of ride sharing services such as Uber®, Lyft®, ZimRide® and Street Car®. For example, the onboard vehicle sharing service may include application program interfaces (APIs) to enable the onboard vehicle system to communicate with these ride sharing services to make the user's vehicle selectable by customers of these ride sharing services. In this way, customers of these ride sharing services may see the user's vehicle as a vehicle which is available to give them a ride in exchange for a financial payment. The onboard vehicle sharing service may be configured so that customers may continue using the native applications of these ride sharing services. For example, a first customer may continue using their Uber® application on their smartphone but still see the user's vehicle as an option available to them for a ride, while contemporaneously a second customer may continue using their Lyft® application on their smartphone and also see the user's vehicle as an option available to them for a ride. This may be similarly true for customers who use Zimride® or Street Car®.

The vehicle may receive data to display the locations of the customers relative to one another on an electronic map displayed on a touchscreen of the vehicle. The user of the vehicle may select one of the customers by providing an input to the touchscreen of the vehicle. Upon selecting the customer, the touchscreen may display a summary of the selected customer and a description of a destination. The user may provide an input to the touchscreen to indicate that the user will give a ride to the selected customer. The selected customer may receive a message to notify them that they will be picked up by the user. The message may include a summary of the user and the user's vehicle. The onboard vehicle sharing system may provide the user with navigation instructions to pick up the user. The onboard vehicle sharing system may provide the customer with additional notifications to inform them of how far the user is from them and an estimate of when the user will arrive.

When in Share Vehicle mode, the vehicle may be viewable by customers of vehicle sharing services such as RelayRides® and Getaround®. For example, the onboard vehicle sharing service may include APIs to enable the onboard vehicle system to communicate with these vehicle sharing services to make the user's vehicle selectable by customers of these vehicle sharing services. In this way, customers of these vehicle sharing services may see the user's vehicle as a vehicle which is available for them to privately drive for a limited period of time configured by the user in exchange for a financial payment. The onboard vehicle sharing service may be configured so that customers may continue using the native applications of these vehicle sharing services. For example, a first customer may continue using their RelayRides® application on their smartphone but still see the user's vehicle as an option available to them, while contemporaneously a second customer may continue using their Getaround® application on their smartphone and also see the user's vehicle as an option available to them. In this way one of the customers may select the vehicle for use for some or all of the predetermined period of time configured by the user.

The customer's smartphone may transmit customer profile data associated with the customer. The vehicle may receive this customer profile data. The onboard vehicle sharing system may reconfigure the vehicle based on the customer profile data. The vehicle may transmit location data describing the location of the vehicle. The customer's smartphone may receive this data and provide navigation instructions to the customer to locate the vehicle. When the customer gets close to the vehicle, the vehicle may blink its headlights or display a message on an outward facing panel of a heads-up display unit. The proximity of the customer to the vehicle may be determined by a global position system (GPS) or Wi-Fi triangulation. In this way the customer may more easily locate the vehicle. The onboard vehicle sharing system may make the user's profile data private while the customer is using the vehicle. The customer may then drive and use the vehicle for the predetermined period of time in exchange for a payment.

In some implementations, the vehicle and the customer's smartphone may be equipped with Bluetooth® or Bluetooth Low Energy® (Bluetooth LE®), and the proximity of the customer to the vehicle may be determined by the vehicle and the smartphone of the customer pairing with one another or beginning the pairing process.

The onboard vehicle sharing system may include functionality to track the user's profits for a time period so that the user may know how much money they have made from sharing rides and sharing their vehicle.

Example System Overview

FIG. 1A illustrates a block diagram of one implementation of a system 100 for providing an onboard vehicle sharing service. The system 100 may include a client 103, a vehicle system 123, a content server 107, a social network server 101, a market server 109, a chat server 113, a ride share service server 115, a vehicle share service server 117 and a network 105. The vehicle system 123 may be accessed by a user 180 and a customer 181. The client 103 may be accessed by the user 180. The user 180 and the customer 181 may be humans. The vehicle system 123 may be the vehicle shared by the user 180.

In the illustrated implementation, the client 103, vehicle system 123, content server 107, social network server 101, market server 109, chat server 113, the ride share service server 115 and the vehicle share service server 117 may be communicatively coupled via the network 105. Communication among these elements of the system 100 may be bidirectional. The communication among these elements of the system 100 and the network 105 may be via a wired or wireless communicative coupling.

The system 100 may include other servers or devices not shown in FIG. 1 including, for example, a navigation server for providing navigation data, a weather server for providing weather data and a financial server for processing financial payments.

The elements included in FIG. 1A may be used by way of example. For example, while the disclosure may only illustrate one of each element in FIG. 1, the disclosure applies to a system 100 having one or more clients 103, one or more vehicle systems 123, one or more content servers 107, one or more social network servers 101, one or more market servers 109, one or more chat servers 113, one or more ride share service servers 115, one or more vehicle share service servers 117, one or more users 180 and one or more customers 181. Although FIG. 1A illustrates one network 105 communicatively coupled to the client 103, vehicle system 123, content server 107, social network server 101, market server 109, chat server 113, ride share service server 115, vehicle share service server 117, in practice one or more networks 105 may be communicatively coupled to these elements of the system 100.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols.

In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a Global Positioning Service (GPS) satellite for providing GPS navigation to the client 103 or the vehicle system 123. The network 105 may be a mobile data network such as 3G, 4G, LTE, Voice-over-LTE ("VoLTE"), or any other mobile data network or combination of mobile data networks. In some implementations, the network 105 may include Bluetooth® Low Energy (Bluetooth LE) communication networks or any other Bluetooth® communication network. In some implementations, the network 105 may include dedicated short-range communication (DSRC) networks.

The vehicle system 123 may be a mobile communication node. For example, the vehicle system 123 may be a vehicle (e.g., an automobile, a bus, an airplane, a boat), a general-purpose robot, a special-purpose robot such as an autonomous vehicle or a semi-autonomous vehicle, a drone or any other mobile system. The vehicle system 123 may be an electric vehicle, hybrid vehicle or a vehicle that includes an internal combustion engine.

In some implementations, the vehicle system 123 may include a computing device that includes a memory and a processor. For example, the vehicle system 123 is a vehicle including an onboard computer. In some implementations, the vehicle system 123 may include a mobile client device. For example, the vehicle system 123 may include a tablet, a smartphone, an infotainment system, or another type of computing device.

A user 180 may interact with the vehicle system 123. For example, the user 180 may be a human that travels in the vehicle system 123. Similarly, the customer 181 may be a human that travels in the vehicle system 123. For example, the vehicle system 123 is in Share Vehicle mode and the customer 181 travels in the vehicle system 123.

The vehicle system 123 may include hardware or software to enable the vehicle system 123 to wirelessly access the network 105. For example, the vehicle system 123 may include an infotainment system to provide one or more network services to a user 180 of the vehicle system 123. The vehicle system 123 may receive network services data via the network 105. The infotainment system of the vehicle system 123 may use the network services data to provide one or more network services for the occupant of the vehicle system 123. The network services data may be stored on the content server 107. The network services data may be any data needed to provide the network service to the vehicle system 123. The network services data may include audio data, video data, e-mail data, calendar data or any other data necessary to stream the network services described below. For example, the network services data may include audio data for enabling the user 180 of the vehicle system 123 to stream music via the infotainment system of the vehicle system 123. In another example, the network services data may include video data for enabling the customer 181 of the vehicle system 123 to stream video via the infotainment system of the vehicle system 123.

In some implementations, the vehicle system 123 may include one or more sensors (not shown), such as a navigation sensor (e.g., a GPS sensor), an infrared detector, a motion detector, a thermostat, a sound detector, and any other type of sensors. For example, the vehicle system 123 may include sensors for measuring one or more of a current time, a current location (e.g., a latitude, longitude, and altitude of a location), an acceleration of the vehicle system 123, a velocity of the vehicle system 123, a fuel tank level of the vehicle system 123, a battery level of the vehicle system 123, an activity of an occupant of the vehicle system 123, etc. The sensors of the vehicle system 123 may include an interior cabin camera, a weight sensor, a carbon monoxide sensor, or any other sensor to detect the activity of the occupant of the vehicle system 123. The sensors of the vehicle system 123 may include a buffer or some other non-transitory memory to store the network services requested by the user of the vehicle system 123.

The vehicle system 123 may include one or more of a user profile data 191 and a customer profile data 192. The user profile data 191 may include any data associated with the user 180 and the customer profile data 192 may include any data associated with the customer 181. In some implementations, the customer profile data 192 may only be stored in the vehicle system 123 when the vehicle system 123 is in Share Vehicle mode. The user profile data 191 may be kept separate from the customer profile data 192 and vice versa. The user profile data 191 may be inaccessible by the customer 181 and the customer profile data 192 may be inaccessible to the user 180.

In some implementations, the user profile data 191 and the customer profile data 192 may be stored locally on a memory of the vehicle system 123 at the same time. Alternatively, the user profile data 191 may only be stored on the vehicle system 123 when the user 180 is using the vehicle system 123 and the customer profile data 192 may only be stored on the vehicle system 123 when the customer 181 is using the vehicle system 123.

The user profile data 191 may describe settings preferred by the user 180 when traveling in the vehicle system 123. For example, the user profile data 191 may describe one or more ergonomic settings for the vehicle system 123 for use by the vehicle system 123 when the user 180 is traveling in the vehicle system 123, one or more device pairings for use by the vehicle system 123 when the user 180 is traveling in the vehicle system 123, user account information for one or more network services associated with the user 180 for use by the vehicle system 123 when the user 180 is traveling in the vehicle system 123, one or more settings for a navigation system of the vehicle system 123 for use by the vehicle system 123 when the user 180 is traveling in the vehicle system 123 and one or more electronic calendars for use by the vehicle system 123 when the user 180 is traveling in the vehicle system 123.

In some implementations, the one or more ergonomic settings described by the user profile data 191 may include ergonomic data describing one or more of the following: how a steering wheel of the vehicle system 123 should be adjusted when the user 180 is traveling in the vehicle system 123; how a seat of the vehicle system 123 should be adjusted when the user 180 is traveling in the vehicle system 123; and how one or more mirrors of the vehicle system 123 should be adjusted when the user 180 is traveling in the vehicle system 123. In some implementations, elements of the vehicle system 123 may be powered by motors that reconfigure these elements based on the ergonomic settings. For example, a driver's seat of the vehicle system 123 may be repositioned by electric motors so that the driver's seat is configured based on the ergonomic settings. The steering wheel and mirrors of the vehicle system 123 may be similarly adjusted. In some implementations, the onboard module 193 may include code and routines to cause a controller and one or more motors of the vehicle system 123 to reconfigure elements of the vehicle system 123 based on user profile data 191.

In some implementations, the settings for the one or more device pairings described by the user profile data 191 may include device pairings data describing one or more devices that are authorized to pair with the vehicle system 123 by the user 180 and any data or information necessary for the vehicle system 123 to pair with these devices via a wireless communication network such as Bluetooth. The devices which pair with the vehicle system 123 using the device pairings data may include one or more clients 103 associated with the user 180. In some implementations, the onboard module 193 may include code and routines to reconfigure a communication unit of the vehicle system 123 to automatically pair with the one or more clients 103 associated with the user 180 based on the user profile data 191.

In some implementations, the user account information for one or more network services associated with the user 180 may include any data or information necessary for the vehicle system 123 to stream one or more network services associated with the user 180. For example, the vehicle system 123 includes an infotainment system that includes functionality to wirelessly stream one or more network services via the network 105. The vehicle system 123 may include other hardware (e.g., one or more displays, one or more speakers, etc.) or software necessary to enable the user 180 to consume the one or more network services streamed via the network 105. In some implementations, the onboard module 193 may include code and routines to reconfigure one or more of a communication unit and an infotainment system of the vehicle system 123 to automatically connect with the one or more network services associated with the user 180 based on the user profile data 191. In this way the vehicle system 123 may be automatically reconfigured so that the vehicle system 123 can stream content from the one or more networks services associated with the user 180 without input from the user 180 to reconfigure the vehicle system 123.

The network services may include one or more of the following: navigation instructions; streaming audio or video (such as Pandora™, Spotify™, iTunes™, Google Play™ YouTube™, Netflix™, Hulu Plus™, Crackle™, Amazon™ Instant Video, Prime Instant Video, Digital Music Store, Prime Music App Store, etc.); social networking (such as Facebook™ Google+™, LinkedIn™, Tinder™, QQ™, etc.); microblogging (such as Twitter™, Tumblr™, etc.); online chatting (such as Google Chat™, Snapchat™, WhatsApp™, etc.); online content sharing (such as Instagram™, Pinterest™, etc.); e-mail (such as Gmail™, Outlook™ Yahoo! Mail™, etc.); file sharing (such as Dropbox™, Google Drive™, MS OneDrive™, Evernote™ etc.); electronic calendar and scheduling (such as Google™ Calendar, MS Outlook™, etc.); and etc. In some implementations, the customer profile data 192 may include data necessary to enable the user 180 to consume one or more of these networks services via the infotainment system of the vehicle system 123.

In some implementations, the user profile data 191 may include one or more of the following: one or more radio station presets for an infotainment system of the vehicle system 123 describing how the infotainment system settings should be adjusted when the user 180 is traveling in the vehicle system 123; one or more audio equalizer settings for the infotainment system of the vehicle system 123 describing how the infotainment system settings should be adjusted when the user 180 is traveling in the vehicle system 123; one or more thermostat settings or other settings for the climate control system of the vehicle system 123 describing how the climate control system of the vehicle system 123 should be adjusted when the user 180 is traveling in the vehicle system 123; and one or more garage door settings enabling the vehicle system 123 to control operation of one or more garage doors associated with the user 180. In some implementations, the onboard module 193 may include code and routines to reconfigure elements of the vehicle system 123 based on the user profile data 191. For example, the infotainment system of the vehicle system 123 may be reconfigured to include the radio station presets for the user 180 based on the user profile data 191.

In some implementations, the one or more settings for the navigation system of the vehicle system 123 included in the user profile data 191 may include the user's home address and any data necessary to enable the vehicle system 123 to navigate to the user's home address when the user 180 is traveling in the vehicle system 123.

In some implementations, the one or more electronic calendars for use by the vehicle system 123 when the user 180 is traveling in the vehicle system 123 may be included in the network services of the user 180.

The customer profile data 192 may describe settings preferred by the customer 181 when traveling in the vehicle system 123. The customer profile data 192 includes similar features as the user profile data 191 with the exception being that the customer profile data 192 describes the settings preferred by the customer 181 whereas the user profile data 191 describes the settings preferred by the user 180.

The vehicle system 123 may include an onboard module 193. The onboard module 193 may include code and routines configured to reconfigure the vehicle system 123 based on the user profile data 191 or the customer profile data 192. In some implementations, the onboard module 193 may include code and routines configured to execute one or more of the steps described below with reference to FIGS. 3A-3F.

In some implementations, the onboard module 193 may include code and routines configured to provide one or more of the graphical user interfaces ("GUI" or "GUIs") 119, 800, 900, 1000, 1100 described below with reference to FIGS. 1B-1D, 8, 9, 10 and 11. In some implementations the onboard module 193 may also include code and routines configured to provide one or more GUIs 400, 500, 600 described below with reference to FIGS. 4, 5, 6A and 6B. These GUIs may be displayed on a display of the vehicle system 123. The display of the vehicle system 123 may include a touchscreen. For example, the infotainment system of the vehicle system 123 includes a touchscreen for displaying these GUIs.

The onboard module 193 may also include code and routines configured to receive inputs via one or more of the GUIs 119, 400, 500, 600, 800, 900, 1000, 1100 and take actions responsive to these inputs. For example, the user 180 may provide an input as described below with reference method 300 of FIG. 3A-3F and the onboard module 193 may receive this input and take action responsive to this input as described below with reference to method 300. In some implementations, the onboard module 193 may include code and routines configured to provide some or all of the functionality described below with reference to one or more of the GUIs 119, 400, 500, 600, 800, 900, 1000, 1100.

In some implementations, the onboard module 193 may include code and routines configured to perform one or more blocks of the method 300 of FIG. 3A-3F when executed by a processor such as processor 225 described below with reference to FIG. 2.

An example implementation of the onboard module 193 will be described in more detail below with reference to FIG. 2.

The client 103 may be a processor-based computing device that includes a processor and a memory. For example, the client 103 may be a personal computer, a laptop computer, a tablet computer, a wearable device, a smartphone, a mobile telephone, a personal digital assistant ("PDA"), a mobile e-mail device, a portable game player, a portable music player, set-top box, a network-connected television, a network-connected home device or any other tangible electronic device capable of accessing the network 105. In some implementations, the wearable device may include, for example, a smartwatch or fitness tracker that communicates via the network 105.

The client 103 may include a customer module 198 and customer profile data 192. The customer module 198 may include code and routines configured to enable the customer 181 to access the ride share service provided by the ride share service server 115 or the vehicle share service provided by the vehicle share service server 117. For example, the customer module 198 is a smartphone application provided by the operators of the ride share service to enable customers 181 to access the ride share service.

In some implementations, the customer module 198 may include code and routines for providing the customer profile data 192 to the vehicle system 123 or the market server 109. For example, the customer module 198 may provide the customer profile data 192 to the vehicle system 123 via Wi-Fi, Bluetooth or some other wireless communication network between the vehicle system 123 and the client 103. In some implementations, the client 103 may be hardwired to a communication unit of the vehicle system 123 and may provide the customer profile data 192 to the vehicle system 123 via this communicative coupling. An example implementation of the communication unit of the vehicle system 123 is described in more detail below with reference to FIG. 2.

In some implementations, the customer module 198 may include code and routines configured to enable the client 103 to pair with the vehicle system 123 via Wi-Fi or some form of Bluetooth using a wireless antenna of the client 103.

In some implementations, the customer module 198 may include code and routines configured to generate one or more of the GUIs 400, 500, 600 described below with reference to FIGS. 4, 5, 6A and 6B. These GUIs may be displayed on a touchscreen of the client 103.

The customer module 198 may also include code and routines configured to receive inputs via one or more of the GUIs 400, 500, 600 and take actions responsive to these inputs. For example, the customer 181 may provide an input as described below with reference to FIG. 6A or 6B and the customer module 198 may receive this input and take action responsive to this input as described below with reference to FIG. 6A or 6B. In some implementations, the customer module 198 may include a special-purpose computer device programmed to provide the functionality described herein with reference to the customer module 198.

The customer profile data 192 may include any data stored on the client 103. For example, the customer profile data 192 may include e-mail data describing e-mails associated with the user 180, electronic calendar data associated with the user 180, an electronic address book including data describing one or more contacts associated with the user 180 and one or more email addresses, physical mailing addresses, telephone numbers and notes associated with these contacts.

In some implementations, the customer profile data 192 may include user account information for one or more network services associated with the user 180 as described above with reference to the user profile data 191. For example, the customer profile data 192 may include any data or information necessary for the user 180 to access or consume network services via the client 103 or the vehicle system 123.

In some implementations, the customer profile data 192 may include X2V data. X2V data may include any type of object-to-vehicle data. X2V data may include information about the object's position. For example, the customer profile data 192 may include one or more bits of data describing the geographic location of the client 103. In this way, the vehicle system 123 may be able to determine the location of the client 103 relative to the vehicle system 123.

In some implementations, the client 103 or the vehicle system 123 may include functionality to determine their relative locations using GPS or wireless signal triangulation (e.g., Wi-Fi triangulation). In some implementations, the X2V data may include one or more bits that are an indication of the source of the data.

In some implementations, one or more of the client 103 and the vehicle system 123 may include hardware or software necessary to communicate via DSRC. DSRC may include one-way or two-way short-range to medium-range wireless communication channels that are designed for automotive use. In some implementations, the DSRC implemented by the vehicle system 123 or the client 103 may use the 5.9 GHz band for transmission.

The social network server 101 may be a hardware server that includes a processor, a memory and network communication capabilities. The social network server 101 may be communicatively coupled to the network 105. The social network server 101 may send and receive data to and from other elements of the system 100 via the network 105.

The social network server 101 may include a social network application 111. The social network application 111 may include code and routines for providing a social network. The social network may be a type of social structure where one or more humans such as user 180 and customer 181 may be connected by a common feature. The common feature may include relationships/connections, e.g., friendship, family, work, an interest, etc. The common features may be provided by one or more social networking systems including explicitly defined relationships and relationships implied by social connections with other online people, where the relationships form a social graph. In some examples, the social graph may reflect a mapping of one or more users 180 and one or more customers 181 and how they may be related.

In some implementations, the social network application 111 may generate a social network that may be used for generating suggestion. For example, the social network application 111 may determine that a user 180 and a customer 181 travel to geographically related locations at similar times of the day and that they have similar interests. Based on this, the social network application 111 may generate a suggestion that the customer 181 share a ride with the user. The suggestion may include a ranked list of customers 181 that are suggested for the user 180 or vice versa.

The content server 107 may be a hardware server that includes a processor, a memory and network communication capabilities. The content server 107 may be communicatively coupled to the network 105. The content server 107 may send and receive data to and from other elements of the system 100 via the network 105. For example, the content server 107 may be configured to provide one or more networks services to the vehicle system 123 or the client 103.

The ride share service server 115 may be a hardware server that includes a processor, a memory and network communication capabilities. The ride share service server 115 may be communicatively coupled to the network 105. The ride share service server 115 may send and receive data to and from other elements of the system 100 via the network 105. For example, the ride share service server 115 may be configured to provide one or more ride share services to one or more of the vehicle system 123 and the client 103. For example, the ride share service server 115 may provide one or more ride share services such as Uber®, Lyft®, ZimRide® and Street Car®. In one embodiment, the vehicle system 123, client 103 or the market server 109 may include one or more application programming interfaces ("API" or "APIs") and other data and hardware necessary to electronically access, communicate and interact with the one or more ride share services provided by the rider share server 115.

The vehicle share service server 117 may be a hardware server that includes a processor, a memory and network communication capabilities. The vehicle share service server 117 may be communicatively coupled to the network 105. The vehicle share service server 117 may send and receive data to and from other elements of the system 100 via the network 105. For example, the vehicle share service server 117 may be configured to provide one or more vehicle share services to one or more of the vehicle system 123 and the client 103. For example, the ride share service server 115 may provide one or more vehicle share services such as RelayRides® and Getaround®. In one embodiment, the vehicle system 123, client 103 or the market server 109 may include one or more application programming interfaces ("API" or "APIs") and other data and hardware necessary to electronically access, communicate and interact with the one or more ride share services provided by the vehicle share service server 117.

The market server 109 may be a hardware server that includes a processor, a memory and network communication capabilities. The market server 109 may be communicatively coupled to the network 105. The memory of the market server 109 may store the user profile data 191, the customer profile data 192 and the API data 144. The API data 144 may include one or more APIs necessary for the market server 109 to access, communicate and interact with the ride share service provided by the ride share service server 115 and the vehicle share service provided by the vehicle share server 117.

The market server 109 may send and receive data to and from other elements of the system 100 via the network 105. For example, the market server 109 may be configured to transmit or manage transmission of the user profile data to the vehicle system 123 responsive to determining that the user 180 is going to use the vehicle system 123. Similarly, the market server 109 may be configured to transmit or manage transmission of the customer profile data 192 to the vehicle system 123 responsive to determining that the customer 181 is going to use the vehicle system 123.

The market server 109 may include a market module 197. In some implementations, the market module 197 includes code and routines to aggregate results from querying one or more ride share services provided by one or more ride share service servers 115. For example, the user 180 may place the vehicle 123 in Share Ride mode. The onboard module 193 may transmit a signal to the market server 109 including a request for one or more customers 181 that are available in the geographic area of the vehicle system 123. The signal may include a geographic data describing the location of the vehicle system 123.

Optionally, the signal may also include an indication of the ride share services which are acceptable to the user 180. For example, the user 180 may not accept customers from some ride share services but may accept customers from other ride share services. The market module 197 may transmit a signal to one or more ride share service servers 115 including a request for one or more customers 181 for the vehicle system 123 based on the geographic location of the vehicle system 123. If one or more ride share services are not acceptable to the user 180, then the market module 197 will not transmit this signal to these services.

The market module 197 may receive ride share data from the one or more ride sharing services including a description of one or more customers 181 and the geographic data describing the geographic location of where the one or more customers 181 want to be picked up and the geographic location of where the one or more customers 181 want to be dropped off.

The ride share data may also include social network data or network services data describing the interest of the one or more customers 181. For example, the social network data may describe the hobbies of the one or more customers 181 and the network services data may describe the music interests of the one or more customers 181. The market module 197 may include code and routines configured to analyze this data and determine one or more suggested customers 181 for the user 180 based on shared interests, relationships between their non-shared interests and geographic proximity of the pick up and drop off locations for the customers 181 relative to the journey start and journey end locations for the user 180. The journey start location of the user 180 may be the geographic location the vehicle system 123 is starting from when the vehicle system 123 is placed in Share Ride mode and the journey end location for the user 180 may be the expected geographic location of the vehicle system 123 when the user 180 ends the present journey.

The market module 197 may transmit the ride share data describing the one or more customers 181 to the vehicle system 123 via the network 105. The ride share data may include an aggregation of the one or more customers available across one or more ride share services. In this way, the market module 197 may provide an electronic market place of customers available across one or more ride share services. The ride share data may include the one or more suggested customers 181 or the onboard module 193 may include code and routines configured to determine the one or more suggested customers 181 for the user 180.

Figure 5:
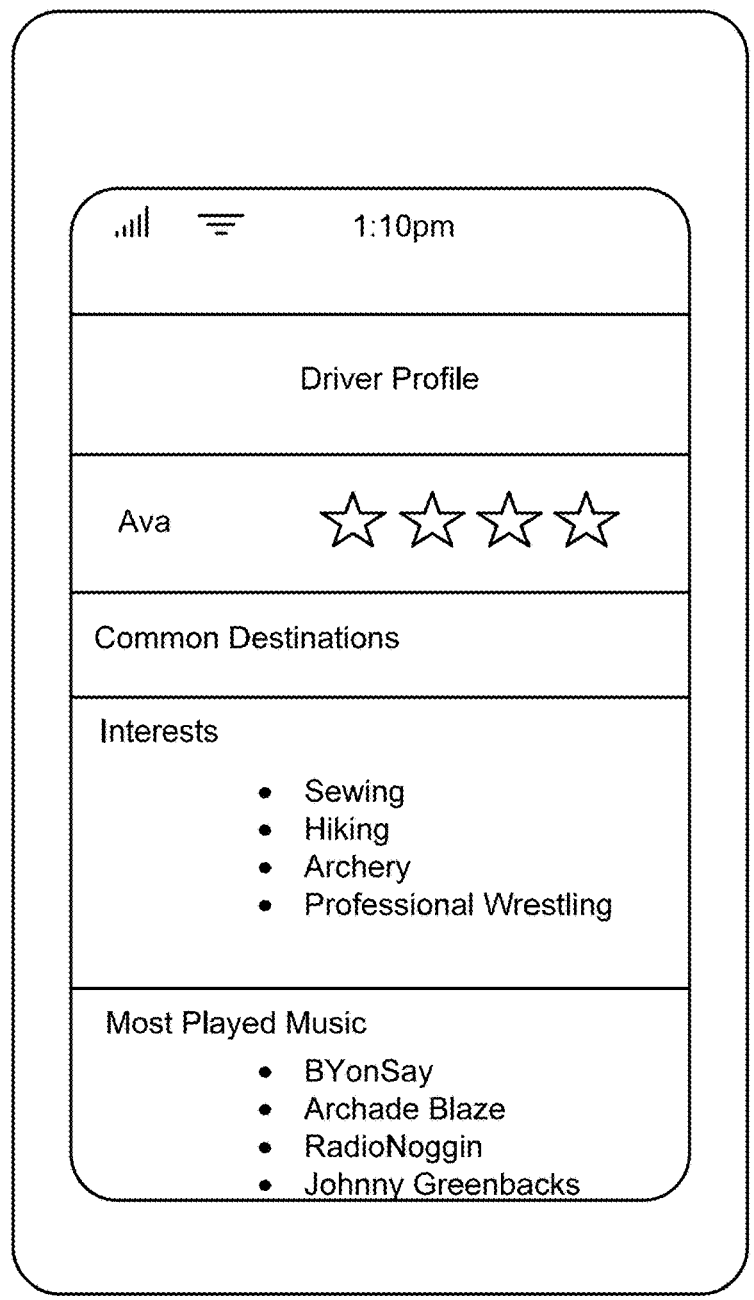
FIG. 5 is a graphic representation of a driver profile graphical user interface.

In some implementations, the ride share data may include graphical data for depicting the customers 181 available to the user 180 on a touchscreen of the vehicle system 123. The customers 181 may be depicted on an electronic map. The electronic map may include a depiction of the geographic location of the customers 181 relative to one another and the vehicle system 123 of the user 180. The depicted customers 181 may include only the suggested customers 181. The depiction of the customers 181 may include an indication of the ride share service that is being used by the customer 181 since this may be relevant to the user 180 when determining which customer 181 to select since the different ride share services may provide different amounts of profit to the user 180 for providing a ride share service. The depiction of the customers 181 may include data describing the social network data and the network service data for each customer 181 similar to what is shown in FIG. 5 (although this depiction may include data describing the user 180 for the benefit of the customer 181).

In some implementations, the market module 197 includes code and routines to aggregate results from querying one or more vehicle share services provided by one or more vehicle share service servers 117. For example, the user 180 may place the vehicle 123 in Share Vehicle mode. The onboard module 193 may transmit a signal to the market server 109 including a description of the time limit input by the user 180 indicating how long the vehicle system 123 is available to customers 181. The signal may include a geographic data describing the location of the vehicle system 123. Other identifying information of the vehicle system 123 may be included such as color, make and model of the vehicle system 123.

Optionally, the signal may also include an indication of the vehicle share services which are acceptable to the user 180. For example, the user 180 may not accept customers from some vehicle share services but may accept customers from other vehicle share services. The market module 197 may transmit a signal to one or more vehicle share service servers 117 including a request for one or more customers 181 for the vehicle system 123 based on the geographic location of the vehicle system 123 and the time limit input. If one or more vehicle share services are not acceptable to the user 180, then the market module 197 will not transmit this signal to these services. In this way, the market module 197 may make the vehicle system 123 available for one or more vehicle share services when the vehicle system 123 is in Share Vehicle mode.

The market module 197 may include code and routines configured to perform one or more blocks of the method 300 described below with reference to FIGS. 3A-3F when executed by a processor such as processor 225. In some implementations, the market module 197 is a special-purpose computing device programmed to perform one or more blocks of the method 300.

In some implementations, the market module 197 may include code and routines configured to provide graphical data for generating one or more of the GUIs 119, 400, 500, 600, 800, 900, 1000, 1100 to one or more of the vehicle system 123 or the client 103. The market module 197 may also include code and routines configured to receive inputs to the one or more GUIs 119, 400, 500, 600, 800, 900, 1000, 1100 and take actions responsive to these inputs. In some implementations, the market module 197 may include code and routines configured to provide some or all of the functionality described below with reference to one or more of the GUIs 119, 400, 500, 600, 800, 900, 1000, 1100.

In some implementations, the market server 109 may store the market module 197 in the memory of the market server 109.

In some implementations, one or more of the onboard module 193, market module 197 and the customer module 198 may be implemented using hardware including a field-programmable gate array ("FPGA") or an application-specific integrated circuit ("ASIC"). In some other implementations, one or more of the onboard module 193, the market module 197 and the customer module 198 may be implemented using a combination of hardware and software. In some implementations, one or more of the onboard module 193, the market module 197 and the customer module 198 may be stored in a combination of the devices and servers, or in one of the devices or servers.

The chat server 113 may include a hardware server that includes a processor, a memory and network communication capabilities. The chat server 113 may be communicatively coupled to the network 105. The chat server 113 may send and receive data to and from other elements of the system 100 via the network 105. In some implementations, the chat server 113 may be configured to provide one or more network services to the vehicle system 123 or the client 103. For example, the chat server 113 provides one or more of the online chatting services described above with reference to the network services. In some implementations, the chat server 113 provides a private online chatting service that is only accessible by the customer 181 and the user 180 who is providing a service to the customer 181. For example, the user 180 may message the customer via the chat service of the chat server 113 to let the customer 181 know information relevant to the user 180 providing a ride share service to the customer 181.

Figure 1B:
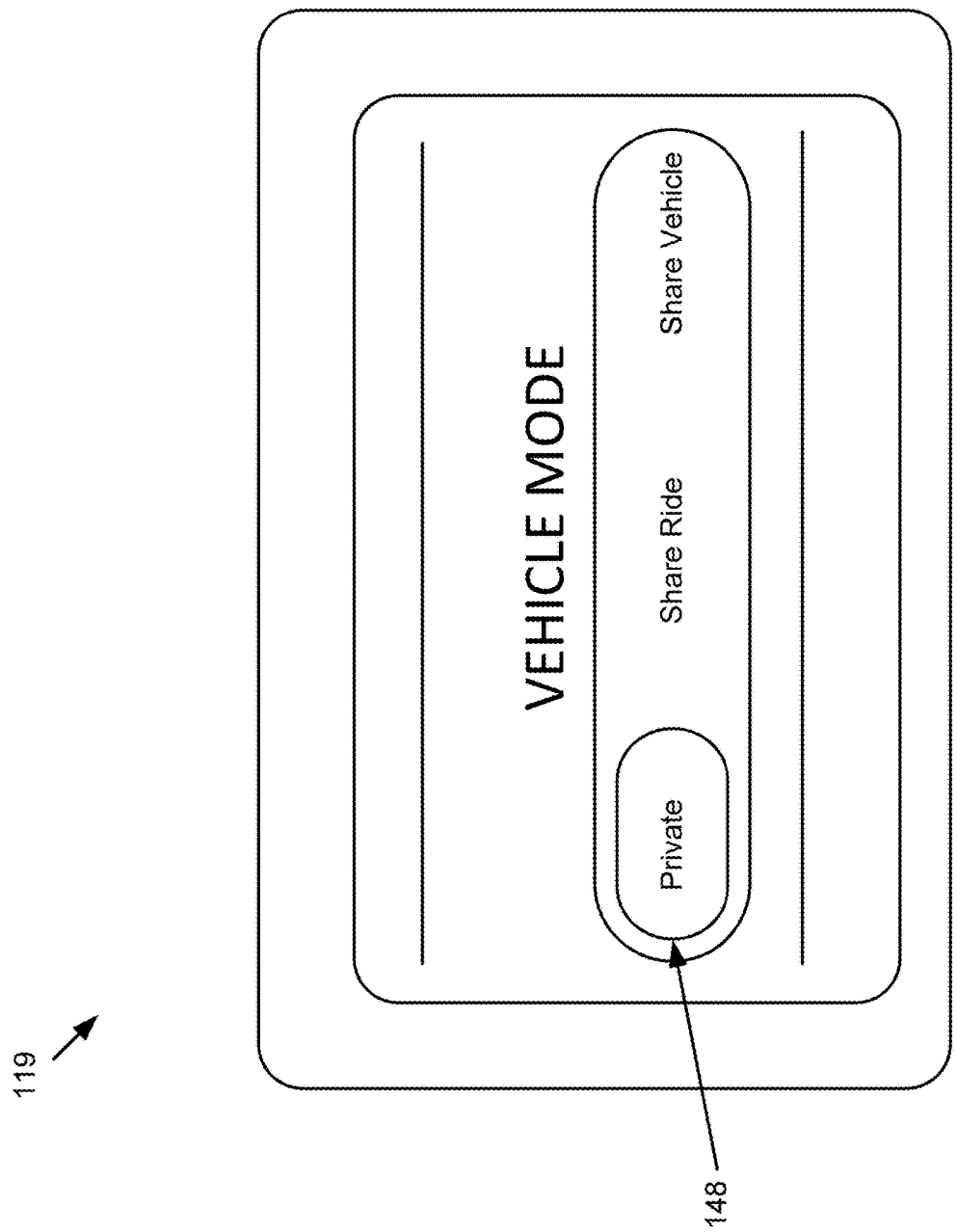
FIGS. 1B, 1C and 1D are a graphic representation of a vehicle mode selection graphical user interface.
Figure 1C:
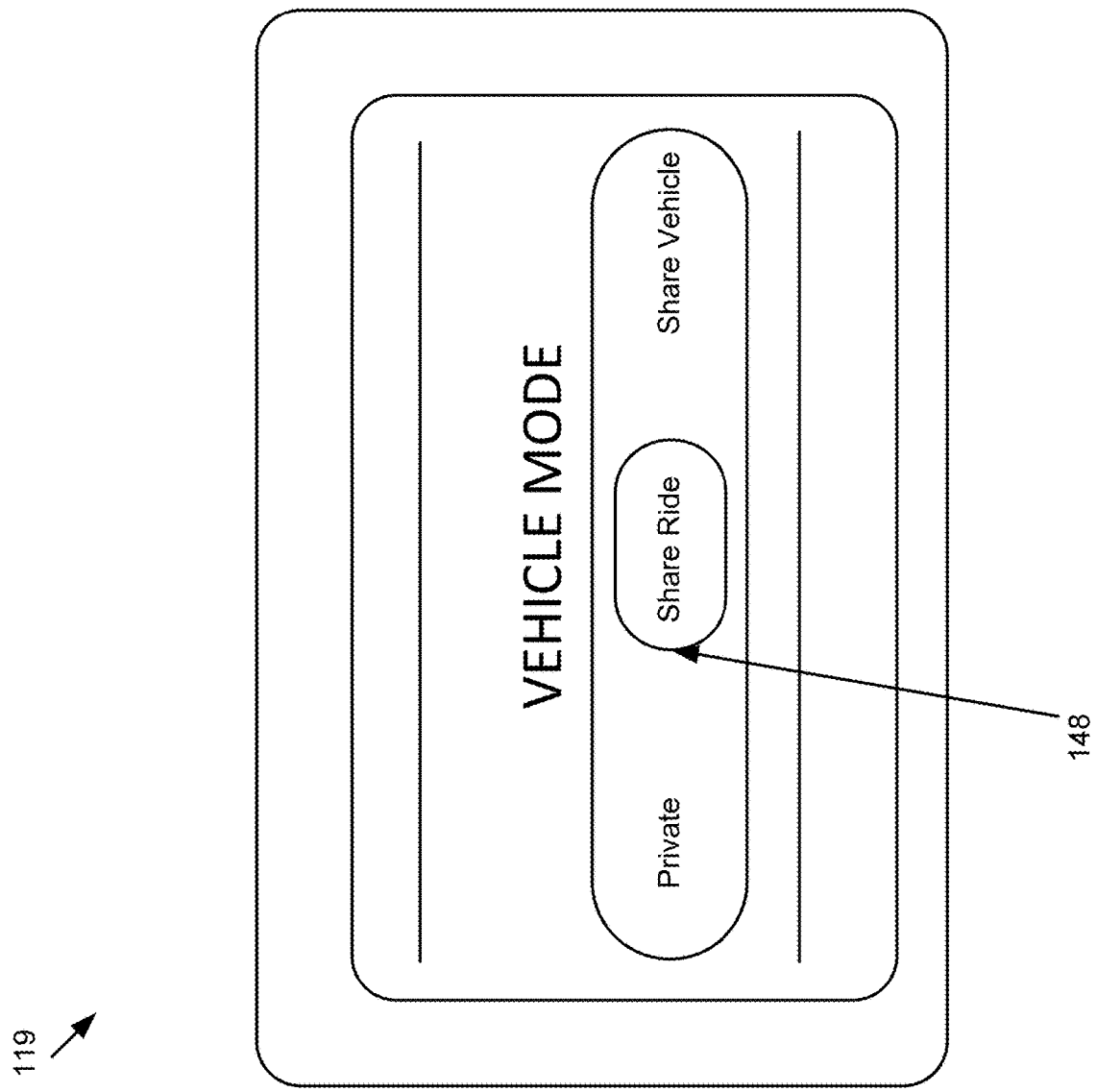
Figure 1D:
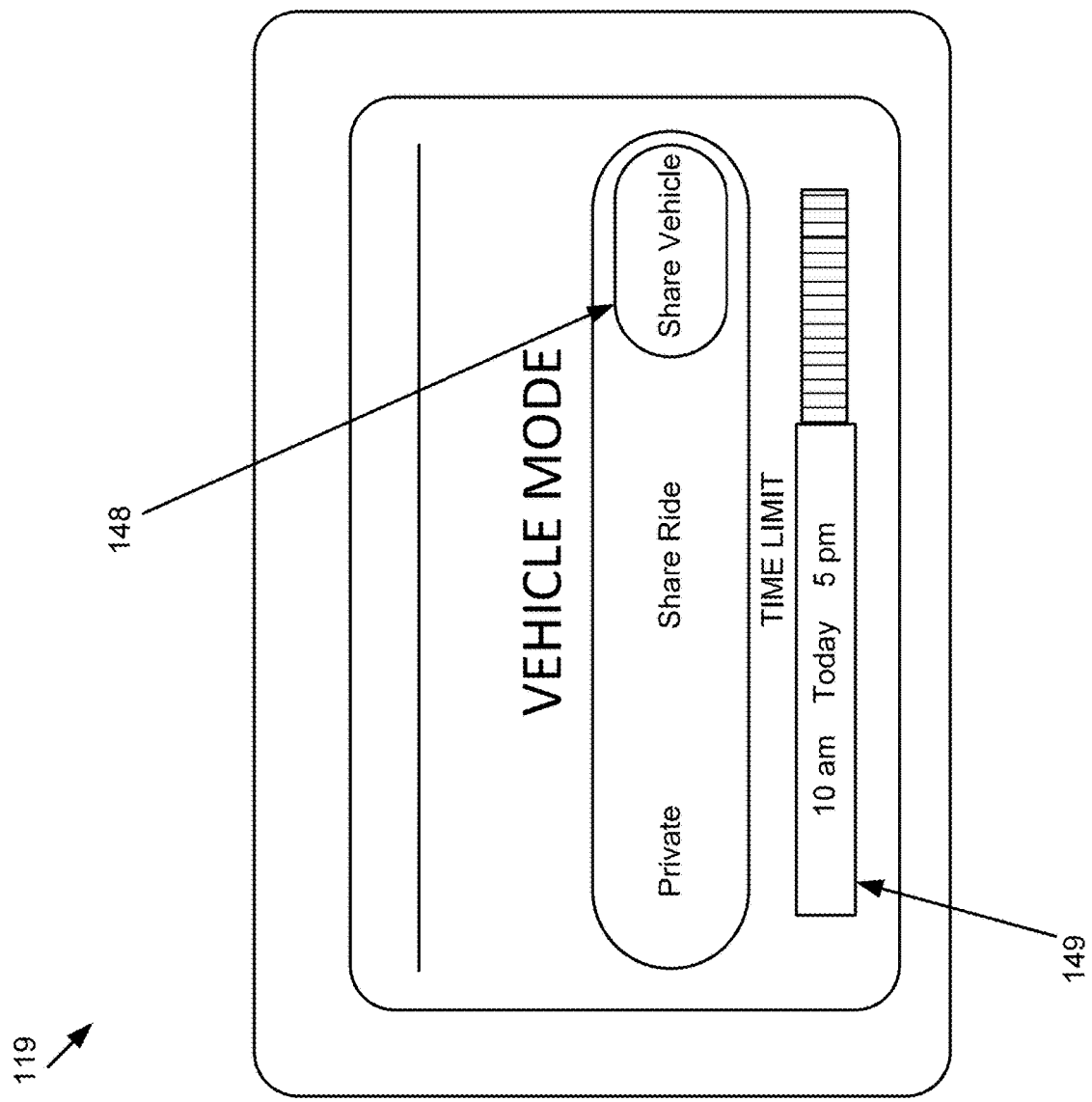

Referring now to FIGS. 1B, 1C and 1D, depicted is an example of a graphic representation of a vehicle mode selection GUI 119. The vehicle mode selection GUI 119 may be used to place the vehicle system 123 in Private mode, Share Ride mode or Share Vehicle mode. The vehicle mode selection GUI 119 may be configured for display on a touchscreen of the vehicle system 123. The vehicle mode selection GUI 119 may receive touchscreen inputs from the user 180. The vehicle mode selection GUI 119 may be configured to be inaccessible by the customer 181 when the vehicle system 123 is in Share Vehicle mode.

Referring to FIG. 1B, the vehicle mode selection GUI 119 indicates that the vehicle system 123 is in Private mode. For example, the user 180 has used their finger to slide the maker 148 to a location on the GUI 119 to provide an input to the touchscreen to place the vehicle system 123 in Private mode.

Referring to FIG. 1C, the vehicle mode selection GUI 119 indicates that the vehicle system 123 is in Share Ride mode. For example, the user 180 has used their finger to slide the maker 148 to a location on the GUI 119 to provide an input to the touchscreen to place the vehicle system 123 in Share Ride mode.

Referring to FIG. 1D, the vehicle mode selection GUI 119 indicates that the vehicle system 123 is in Share Vehicle mode. For example, the user 180 has used their finger to slide the maker 148 to a location on the GUI 119 to provide an input to the touchscreen to place the vehicle system 123 in Share Vehicle mode. The user 180 has also provided a time limit input 149 to the touchscreen to indicate that the vehicle system 123 is available for a predetermined amount of time. In this example, the vehicle system 123 is available to customers 181 from 10:00 AM until 5:00 PM today as indicated by the time limit input 149.

Figure 2:
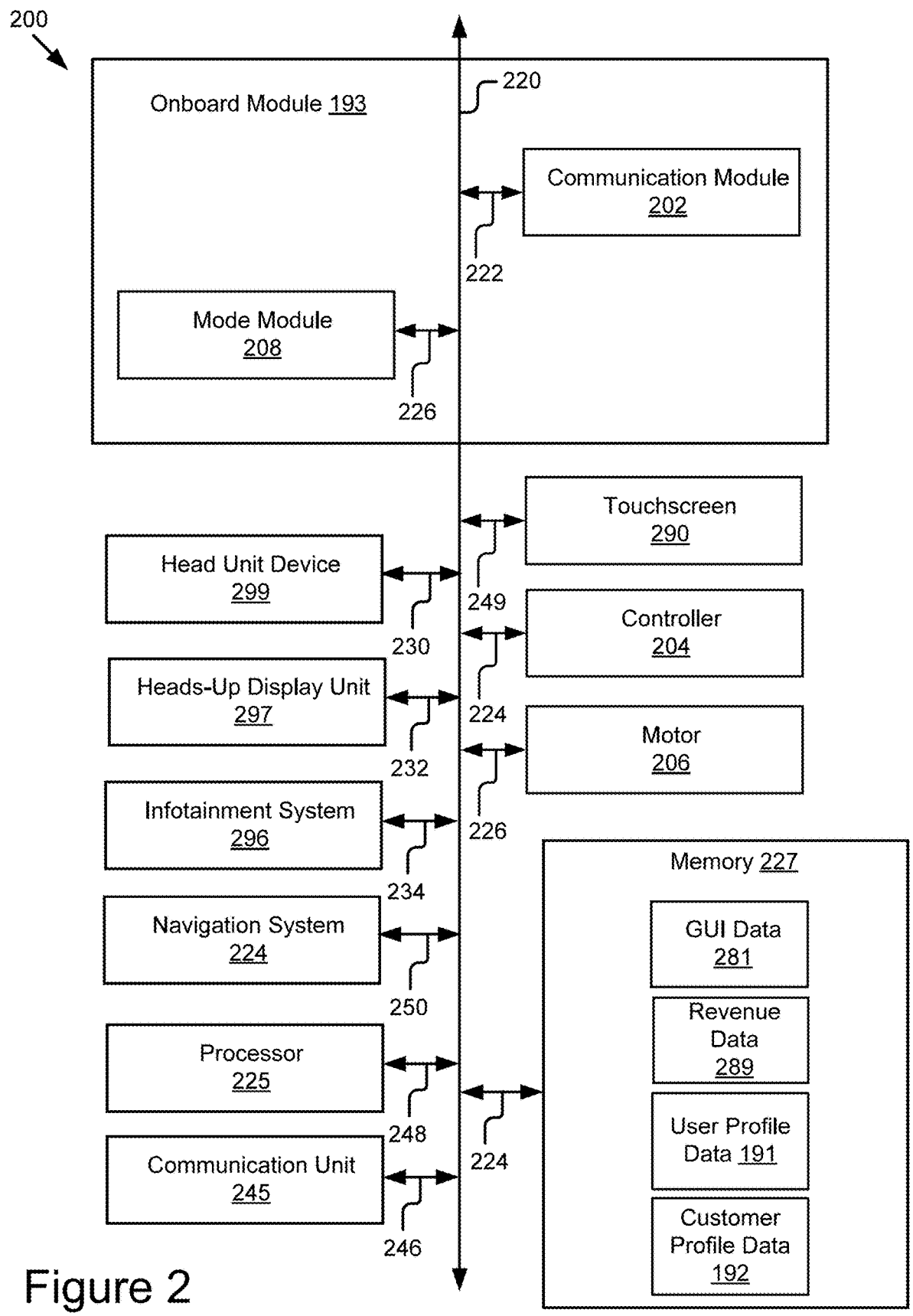
FIG. 2 is a block diagram illustrating an example onboard vehicle sharing system.

Referring now to FIG. 2, an example implementation of an onboard vehicle sharing system 200 is depicted. The onboard vehicle sharing system 200 may include the onboard module 193, a controller 204, a motor 206, a head unit device 299, a heads-up display unit 297, an infotainment system 296, a navigation system 224, a processor 225, a communication unit 245, a memory 227 and a touchscreen 290. These elements of the onboard vehicle sharing system 200 may be communicatively coupled by a bus 220. The controller 204 may be communicatively coupled to the bus 220 via signal line 224. The motor 206 may be communicatively coupled to the bus 220 via signal line 226. The head unit device 299 may be communicatively coupled to the bus 220 via signal line 230. The heads-up display unit 297 may be communicatively coupled to the bus 220 via signal line 232. The infotainment system 296 may be communicatively coupled to the bus 220 via signal line 234. The navigation system 224 may be communicatively coupled to the bus 220 via signal line 250. The processor 225 may be communicatively coupled to the bus 220 via signal line 248. The communication unit 245 may be communicatively coupled to the bus 220 via signal line 246. The memory 227 may be communicatively coupled to the bus 220 via signal line 224. The touchscreen 290 may be communicatively coupled to the bus 220 via the signal line 249.

In some implementations, the onboard vehicle sharing system 200 may be a processor-based computing device. For example, the onboard vehicle sharing system 200 may be the vehicle system 123 described above with reference to FIG. 1A. In some implementations, the onboard vehicle sharing system 200 is an onboard element of the vehicle system 123.

In some implementations, the onboard vehicle sharing system 200 may include a special-purpose computing device configured to generate one or more of the one or more of the GUIs 119, 800, 900, 1000, 1100 described below with reference to FIGS. 1B-1D, 8, 9 and 10. In some implementations, the onboard vehicle sharing system 200 may include a special-purpose computing device configured to generate one or more of the GUIs 400, 500, 600 described below with reference to FIGS. 4, 5, 6A and 6B. These GUIs 119, 400, 500, 600, 800, 900, 1000, 1100 may be displayed on the touchscreen 290. The GUI data 281 may include graphical data for displaying one or more of the GUIs 119, 400, 500, 600, 800, 900, 1000, 1100 on the touchscreen 290. In some implementations, some or all of the GUI data 281 is received via the network 105. For example, the market module 197 of the market server 109 may transmit the GUI data 281 via the network 105. The onboard vehicle sharing system 200 may receive the GUI data 281 and the onboard vehicle sharing system 200 may store the GUI data 281 on the memory 227. The vehicle onboard module 193 may retrieve the GUI data 281 from the memory 227 and cause the touchscreen 290 to display one or more of the GUIs 119, 400, 500, 600, 800, 900, 1000, 1100 based on the GUI data 281.

In some implementations, the onboard vehicle sharing system 200 may include a special-purpose computing device configured to receive inputs via one or more of the GUIs 119, 400, 500, 600, 800, 900, 1000, 1100 and take actions responsive to these inputs. For example, the user 180 may provide an input as described below with reference method 300 of FIG. 3A-3F and the vehicle onboard module 193 may receive this input and take action responsive to this input as described below with reference to method 300. In some implementations, the onboard vehicle sharing system 200 may include a special-purpose computing device configured to provide some or all of the functionality described below with reference to one or more of the GUIs 119, 400, 500, 600, 800, 900, 1000, 1100.

The communication unit 245 may transmit and receive data to and from the user service system 200. In some implementations, the communication unit 245 may include a port for direct physical connection to the network 105 or to another communication channel. For example, the communication unit 245 may include a USB, SD, CAT-5, or similar port for wired communication with one or more elements of the system 100. In some implementations, the communication unit 245 may include a wireless transceiver for exchanging data or other communication channels using one or more wireless communication methods, including IEEE 802.11, IEEE 802.16, Bluetooth®, NFC or another suitable wireless communication method.

In some implementations, the communication unit 245 may include a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 may include a wired port and a wireless transceiver. The communication unit 245 may also provide other conventional connections to the network 105 for distribution of files or media objects using standard network protocols including TCP/IP, HTTP, HTTPS, and SMTP, etc.

In some implementations, the communication unit 245 may include a NFC module for providing electronic payments via NFC. The NFC module of the communication unit 245 may include code and routines for providing the electronic payments via NFC.

The processor 225 may include an arithmetic logic unit, a microprocessor, a general-purpose controller, or some other processor array to perform computations and provide electronic display signals to a display device. The processor 225 may process data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

In some implementations, the onboard vehicle sharing system 200 may include a special-purpose computing device configured to perform one or more blocks of the method 300 described below with reference to FIG. 3 when executed by the processor 225.

The memory 227 may store instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 may be a tangible computer-readable memory. The memory 227 may be a non-transitory computer-readable memory.

As illustrated in FIG. 2, the memory 227 stores GUI data 281, revenue data 289, user profile data 191 and customer profile data 192. The user profile data 191 and the customer profile data 192 were described above with reference to FIG. 1A, and so that description will not be repeated here.

The GUI data 281 may include data for generating one or more GUIs. The GUI data 281 may be configured to generate GUIs that receive input via the touchscreen 290. In some implementations, the GUI data 281 may be configured to generate one or more of the GUIs 119, 400, 500, 600, 800, 900, 1000, 1100 described with reference to FIGS. 1B-1D, 4, 5, 6A, 6B, 8, 9, 10 and 11. In some implementations, the vehicle sharing service system 200 may be a special-purpose computing device configured to retrieve the GUI data 281 and render one or more of the GUIs 119, 400, 500, 600, 800, 900, 1000, 1100.

In some implementations, the GUI data 281 may be configured to generate GUIs that are optimized for display on a heads-up display unit 297 of a vehicle system 123. In some implementations, the GUIs generated using the GUI data 281 may be optimized to receive touch inputs (e.g., via the touchscreen 290).

In some implementations, the GUI data 281 may be configured to generate webpages. For example, the GUI data 281 may be configured to generate one or more encrypted webpages. In some implementations, the GUI data 281 may be configured to generate one or more webpages that are optimized for electronic financial agreements based on inputs provided to a GUI via the touchscreen 290.

Figure 10:
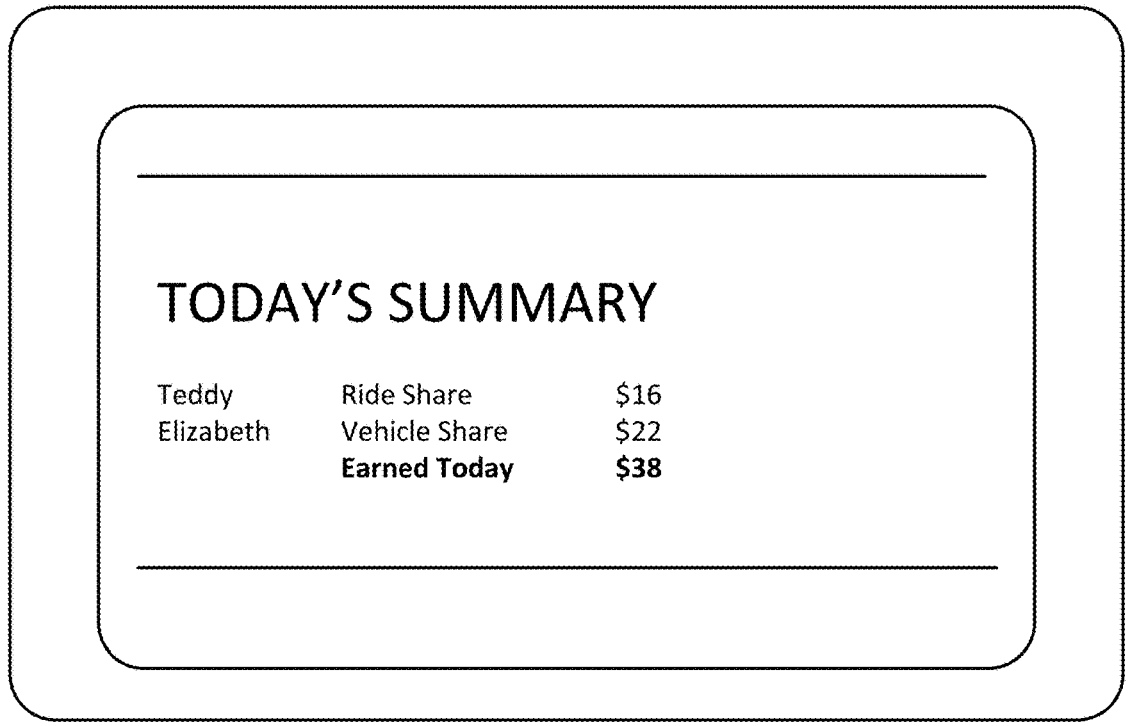
FIG. 10 is a graphic representation of a revenue summary graphical user interface.

The revenue data 289 may describe the revenue generated for the user 180 by providing ride sharing services or vehicle sharing services. An example GUI depicting some or all of the revenue data 289 is depicted in FIG. 10.

The touchscreen 290 may include an electronic visual display that the user 180 may control through touch or gestures. The touchscreen 290 may include a display for displaying one or more of the GUIs 119, 400, 500, 600, 800, 900, 1000, 1100. The display of the touchscreen 290 may be configured to receive one or more inputs to the GUIs 119, 400, 500, 600, 800, 900, 1000, 1100. The touchscreen 290 may include hardware, software or a combination of hardware and software for receiving, detecting and interpreting inputs received from the user 180. In some implementations, the inputs received, detected and interpreted by the touchscreen 290 may include touch or gestures provided by a bare hand or finger of the user 180 or the customer 181. In some implementations, the display of the touchscreen 290 may be configured to receive one or more of the inputs described below with reference to the method 300 described below with reference to FIG. 3.

In some implementations, the user 180 may control or provide inputs to the touchscreen 290 by touching the display of the touchscreen 290 with a stylus or pen configured to provide an input to the touchscreen 290. In some implementations, the user 180 may control or provide inputs to the touchscreen 290 by touching the screen with one or more fingers. The fingers of the user 180 may be bare or gloved in a material configured to provide an input to the touchscreen 290. In some implementations, the touchscreen 290 may include any hardware or software needed to be controlled or determine inputs based on one or more touches provided by the user 180 to the display of the touchscreen 290.

In some implementations, the touchscreen 290 may be an element of a smartphone, tablet computer, wearable device such as a smart watch, or touch sensitive monitor or display peripheral. In some implementations, the touchscreen 290 may be an element of the head unit device 299, the heads-up display unit 297 or the infotainment system 296 of the onboard vehicle sharing system 200.

The motor 206 may be an electric motor. The motor 206 may an element of a vehicle. For example, the motor 206 may be an element of the vehicle system 123. In some implementations the motor 206 is a servo motor or some other electric motor. Although only one motor 206 is depicted in FIG. 2, in practice the onboard vehicle sharing system 200 may include one or more motors 206.

In some implementations, the motors 206 may be installed in the vehicle system 123 to control one or more ergonomic settings of the vehicle system 123. For example, the driver's seat of the vehicle system 123 may include one or more motors 206 to control the ergonomic configuration of the driver's seat.

The controller 204 may be a controller for controlling the operations of the motors 206. The vehicle system 123 may include one or more controllers 204. The controller 204 may use the user profile data 191 to reconfigure the ergonomic configuration of the vehicle system 123 based on the ergonomic settings indicated by the user profile data 191. For example, assume that a user 180 had previously traveled in the vehicle system 123 from 12:00 PM to 1:30 PM and that a customer 181 having different ergonomic settings had traveled in the vehicle system 123 from 1:30 PM to 3:00 PM. The customer 181 may park the vehicle system 123 at 2:55 PM. The market module 197 may transmit a signal indicating that the vehicle system 123 should be reconfigured based on the user profile data 191 responsive to an indication that the customer 181 has left the vehicle system 123. The onboard module 193 of the onboard vehicle sharing system 200 may retrieve the user profile data 191. The onboard module 193 may use the controller 204 to drive the motors 206 to reconfigure the ergonomic settings of the vehicle system 123 based on the user profile data 191. For example, the driver's seat of the vehicle may be reconfigured to a distance away from the steering wheel that matches or is similar to the distance that is preferred by the user 180 as indicated by the user profile data 191. The controller 204 and the motor 206 may reconfigure other elements of the vehicle system 123 so that the vehicle system 123 has the same or similar ergonomic settings which are preferred by the user 180.

The head unit device 299 may include a hardware device configured to provide the user 180 or customer 181 control of entertainment media and network services provided by the onboard vehicle sharing system 200. For example, the onboard vehicle sharing system 200 is an element of the vehicle system 123 and the head unit device 299 includes functionality to enable the user 180 to control the streaming of content from the content server 107 via the network 105 based on the user profile data 191. The content may include one or more network services.

The heads-up display unit 297 may include hardware for displaying three-dimensional (3D) graphical data in front of a user such that they do not need to look away from the road to view the graphical data. For example, the heads-up display unit 297 may include a physical screen or it may project the graphical data onto a transparent film that is part of the windshield of the vehicle system 123 or part of a reflector lens. In some implementations, the heads-up display unit 297 is included as part of the vehicle system 123 during the manufacturing process or is later installed. In other implementations, the heads-up display unit 297 is a removable device. In some implementations, the graphical data may adjust a level of brightness to account for environmental conditions, such as night, day, cloudy, brightness, etc.

The graphical data used by the heads-up display unit 297 may be stored on the memory 227. For example, the graphical data used by heads-up display unit 297 may be included in the GUI data 281 stored on the memory 227. The heads-up display unit 297 may receive graphical data for display from the onboard module 193 or the communication interface 245. For example, the heads-up display unit 297 receives GUI data 281 to cause the heads-up display unit 297 to display two dimensional or three dimensional renderings of one or more of the GUIs 119, 400, 500, 600, 800, 900, 1000, 1100. The heads-up display unit 297 may display graphics as three-dimensional Cartesian coordinates (e.g., with x, y, z dimensions).

The infotainment system 296 may include an in-vehicle infotainment (IVI) system. The infotainment system 296 may include one or more hardware devices to provide one or more of the following: audio entertainment; audiovisual entertainment; automotive navigation; and one or more network services. The content provided by the infotainment system 296 may be locally stored on the memory 227 or streamed to system 200 via the network 105. For example, the onboard vehicle sharing system 200 is included in the vehicle system 123 and the infotainment system 296 streams one or more network services from the content server 107 via the network 105.

The navigation system 224 may include an automotive navigation system configured to provide a navigation service. For example, the navigation system 224 may provide one or more of navigation instructions, maps, points of interest, ratings for points of interest and reviews for points of interest. In some embodiments, the navigation system 224 may be an element of the infotainment system 296 or the head unit device 299.

In some implementations, the onboard module 193 may include code and routines configured to generate one or more of the GUIs 119, 400, 500, 600, 800, 900, 1000, 1100 described with reference to FIGS. 1B-1D, 4, 5, 6A, 6B, 8, 9, 10 and 11 using the GUI data 281. In some implementations, the onboard module 193 may include code and routines configured to receive inputs via one or more of the GUIs 119, 400, 500, 600, 800, 900, 1000, 1100 and take actions responsive to these inputs. For example, the user 180 may provide an input to a vehicle mode selection GUI 119 described above with reference to FIGS. 1B-1D using the touchscreen 290. The onboard module 193 may take action responsive to this input as described below with reference to method 300 of FIGS. 3A-3F. In some implementations, the onboard module 193 may include code and routines configured to provide some or all of the functionality described below with reference to one or more of the GUIs 119, 400, 500, 600, 800, 900, 1000, 1100.

In some implementations, the onboard module 193 may include code and routines configured to perform one or more blocks of the method 300 described below with reference to FIGS. 3A-3F when executed by the processor 225.

In some implementations, the onboard module 193 may include a communication module 202. The communication module 202 may be code and routines configured to handle communications between the onboard module 193 and the other components of the onboard vehicle sharing system 200. In some implementations, the communication module 202 may be stored in the memory 227 and accessible and executable by the processor 225. The communication module 202 may be communicatively coupled to the bus via signal line 222.

The communication module 202 may send and receive data, via the communication unit 245, to and from one or more of the entities of the system 100. For example, the communication module 202 receives, via the communication unit 245, the customer profile data 192 via the network 105.

In some implementations, the communication module 202 may receive touchscreen inputs to a GUI via the communication unit 245. For example, a user 180 may provide an input to the touchscreen 290. The communication unit 245 may receive this input via the touchscreen 290 and transmit input data describing the input to the communication module 202. The communication module 202 may store the input data on the memory 227. In some implementations, the communication module 202 may cause the communication unit 245 to transmit the input data to the market server 109 for use by the market module 197.

In some implementations, the communication module 202 receives data from one or more components of the user service system 200 and stores the data in the memory 227. For example, the communication module 202 receives input data from the touchscreen 290 and stores it in the memory 227.

The onboard module 193 may include a mode module 208. The mode module 208 may include code and routines for providing some or all of the functionality of method 300 described below with reference to FIGS. 3A-3F when executed by the processor 225. The mode module 208 may be communicatively coupled to the bus 220 via signal line 226.

Example Method

One or more blocks of the method 300 may be performed by the onboard vehicle sharing system 200. For example, the onboard vehicle sharing system 200 may be a special-purpose processor-based computing device configured to execute one or more blocks of the method 300. In some implementations, the onboard module 199 may include code and routines configured to perform one or more of the blocks of the method 300 when executed by the processor 225.

In some implementations, one or more blocks of the method 300 may be performed by the market module 197. For example, the market module 197 may be a special-purpose processor-based computing device configured to execute one or more blocks of the method 300. In some implementations, the market module 197 may include code and routines configured to perform one or more of the blocks of the method 300 when executed by a processor such as processor 225

The blocks of the method 300 may be executed in any order, and one or blocks may be omitted according to some implementations.

At block 302 the mode of the vehicle system 123 may be monitored. At block 303, a determination may be made regarding whether the vehicle system 123 is in Private mode.

If the vehicle system 123 is in Private mode, then the method 300 may proceed to block 304. If the vehicle system 123 is not in Private mode, then the method 300 may proceed to block 305.

At bock 305 a determination may be made regarding whether the vehicle system 123 is in Share Ride mode.

If the vehicle system 123 is not in Share Ride mode, then the method 300 may proceed to block 306. If the vehicle system 123 is in Share Ride mode, then the method 300 may proceed to block 308 of FIG. 3B.

Figure 3A:
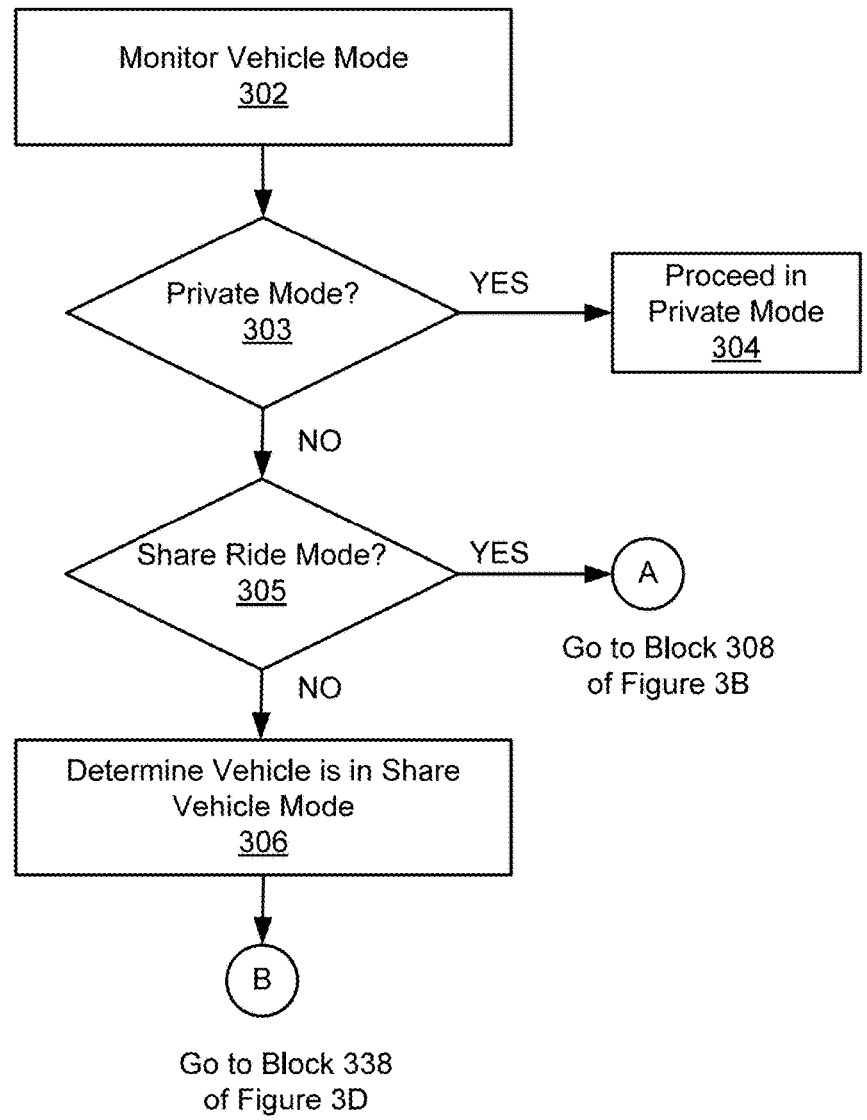
FIGS. 3A, 3B, 3C, 3D, 3E and 3F are a flowchart of an example method for providing an onboard vehicle sharing service.
Figure 3B:
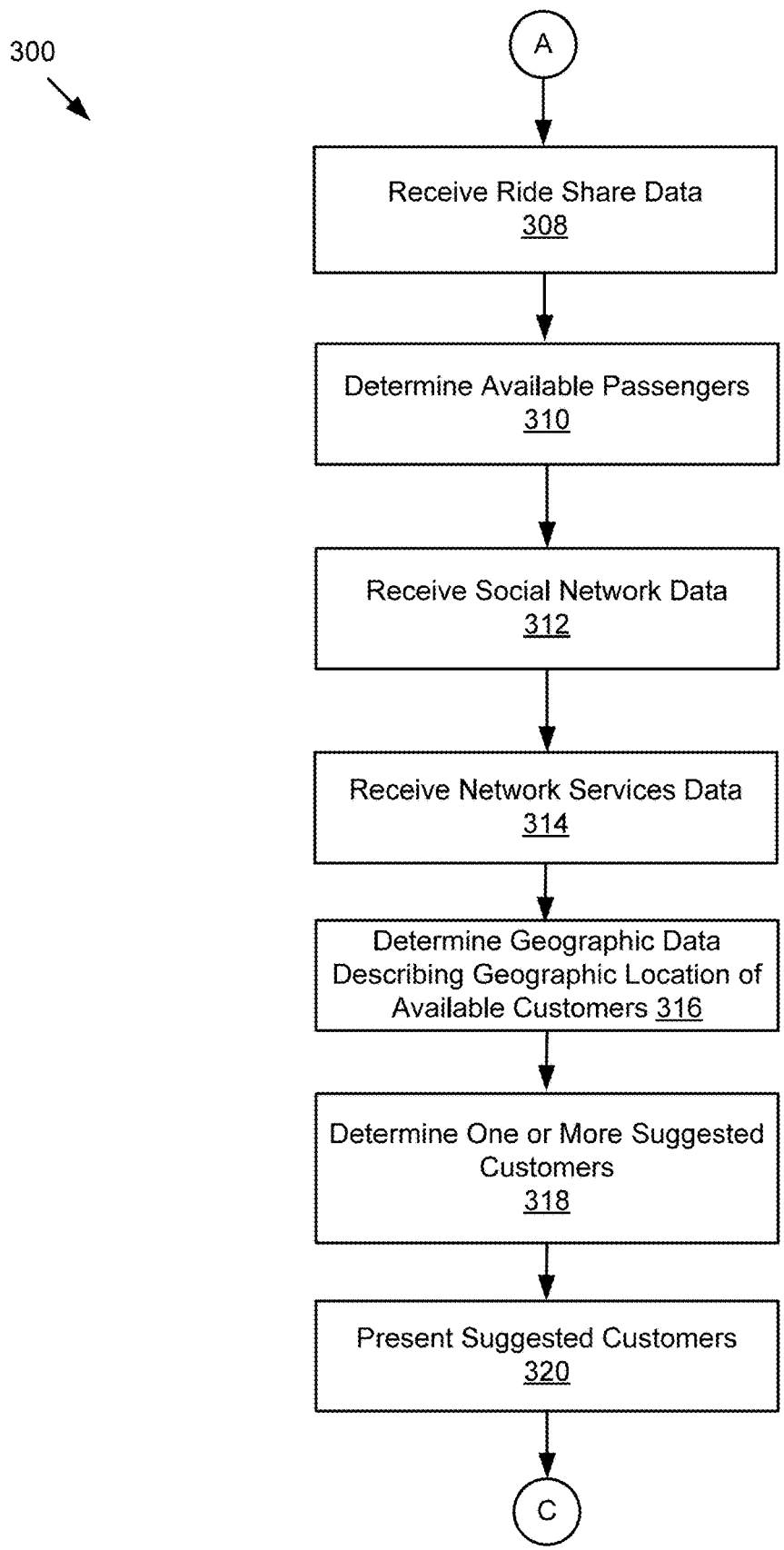
Figure 3C:
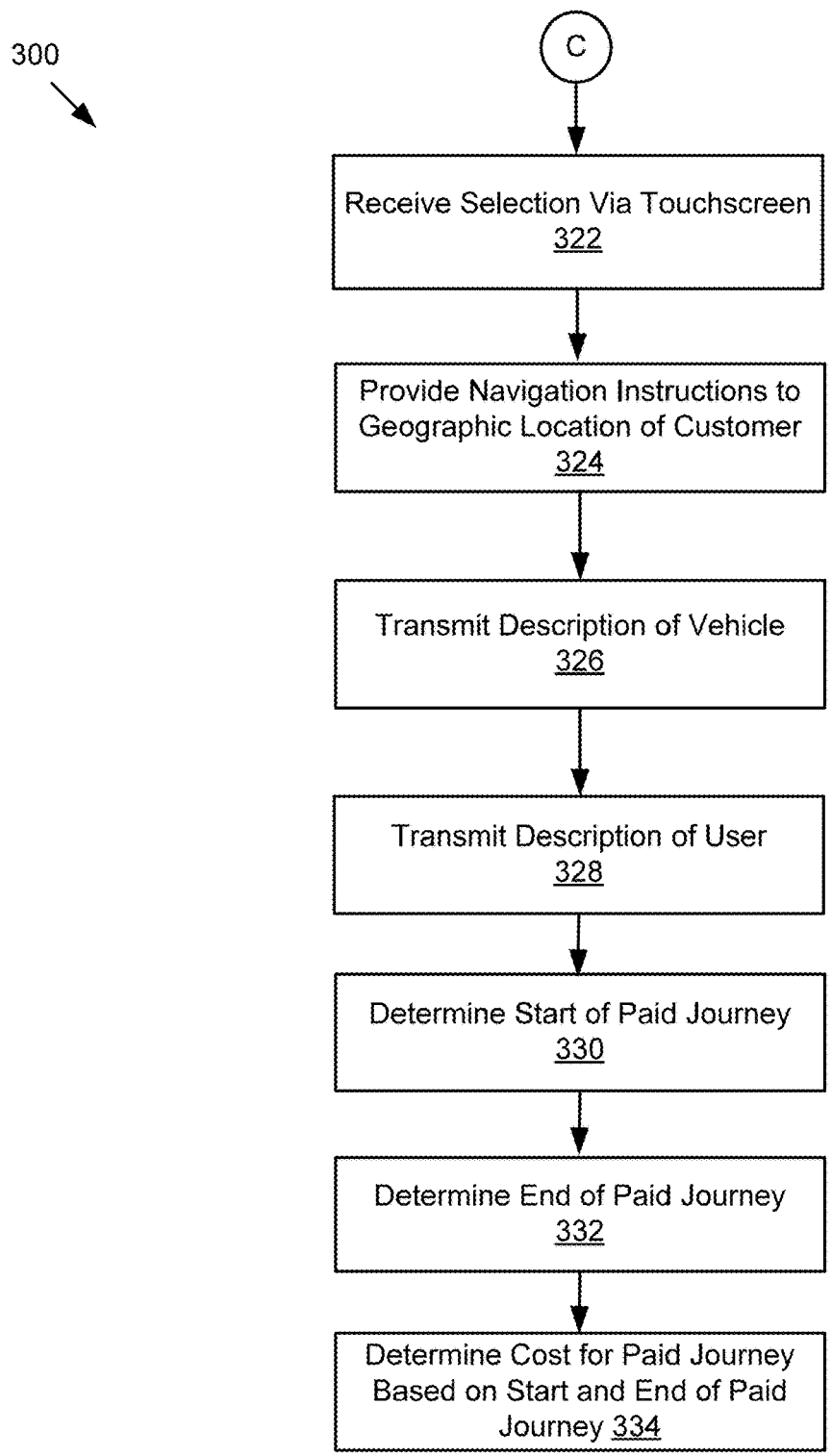
Figure 3D:
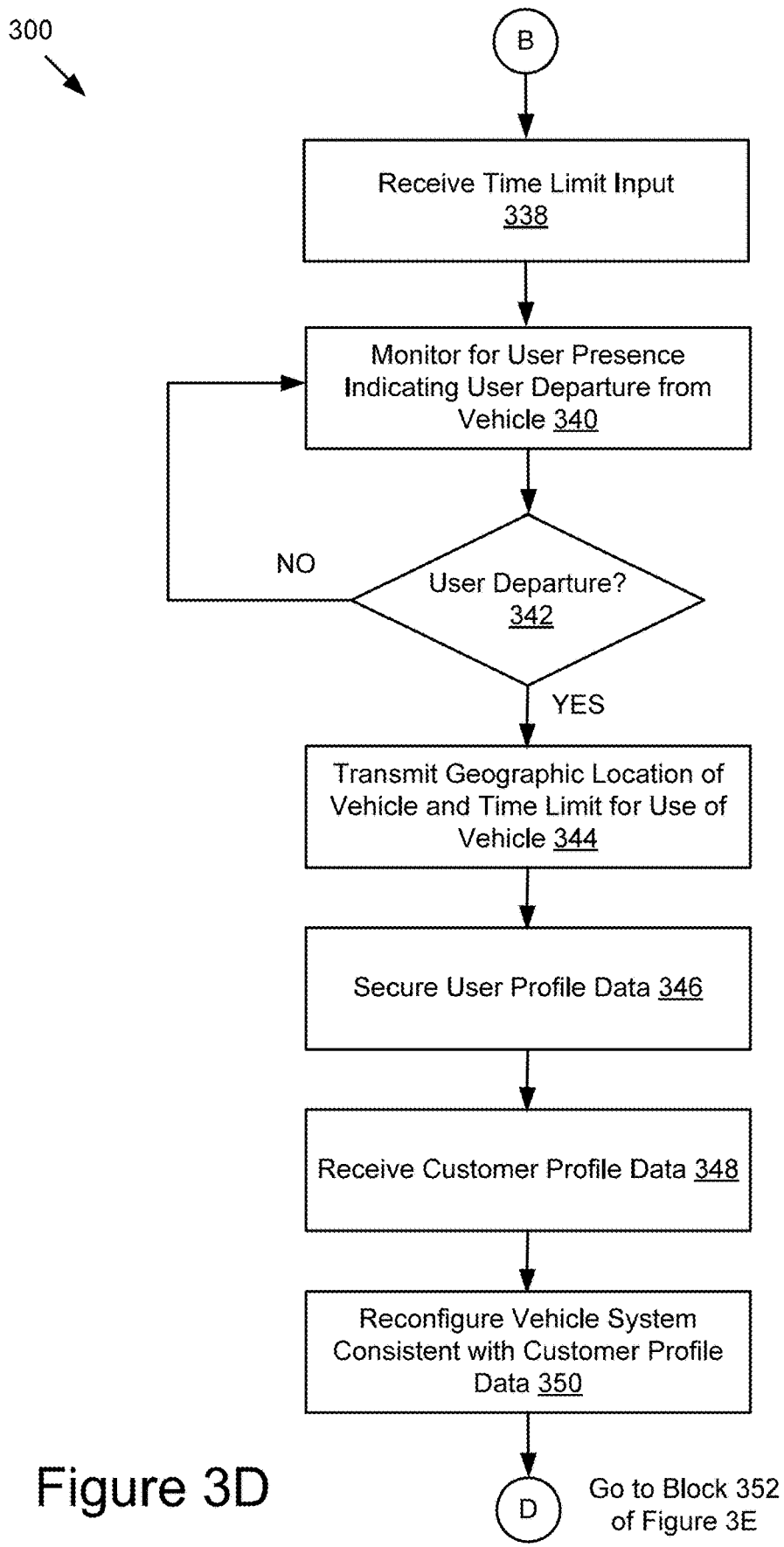

At block 306, a determination may be made that the vehicle system 123 is in Share Vehicle mode and the method 300 may proceed to block 338 of FIG. 3D.

Referring now to FIG. 3B. At block 308, ride share data may be received. At block 310 one or more available passengers may be determined.

At block 312 social network data may be received. At block 314 the network services data may be received. In some implementations, one or more of blocks 312 and 314 may be optional features of the method 300. In some implementations, one or more of the social network data and the network services data may be included in the ride share data received at block 308.

Figure 11:
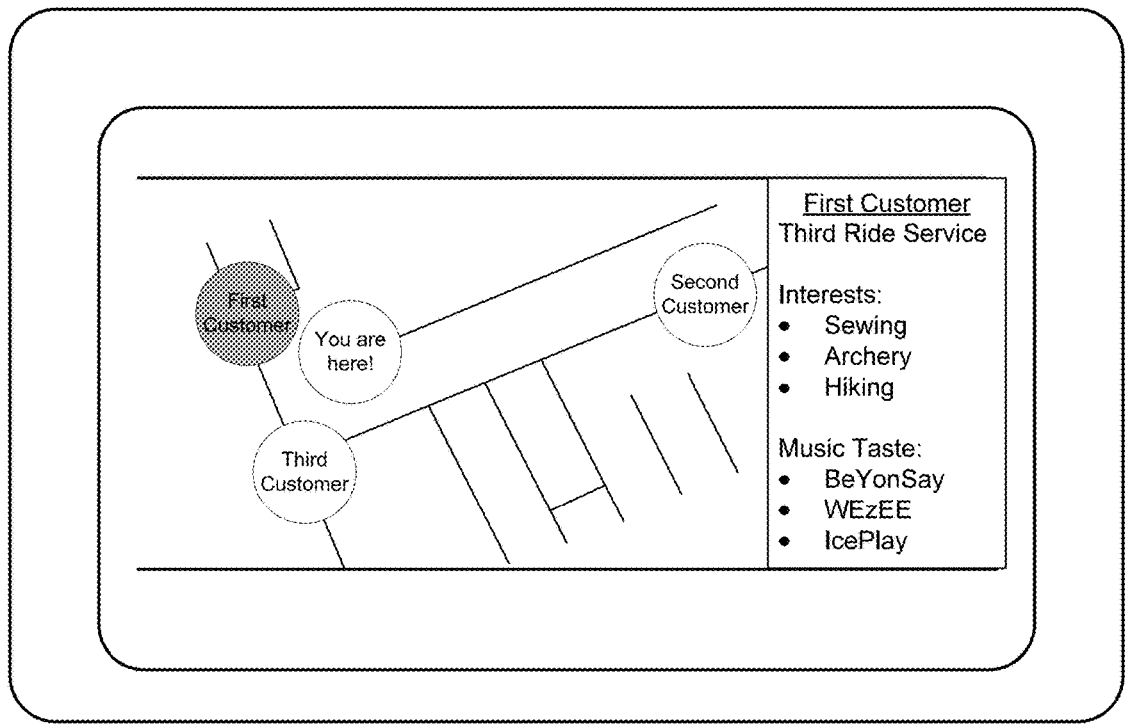
FIG. 11 is a graphic representation of a customer summary graphical user interface.

At block 316, geographic data describing the geographic location of one or more available customers 181 may be determined. In some implementations, the geographic data may be included in the ride share data received at block 308. At block 318, one or more suggested customers 181 may be determined based on one or more of the ride share data, social network data, network services data and the geographic data. At block 320, a graphic representation of the one or more suggested customers may be presented to the user 180 via the touchscreen 290. For example, the customer summary GUI 1100 may be displayed on the touchscreen 290 as depicted in FIG. 11.

Referring now to FIG. 3C, at block 322 a selection of a customer 181 may be received. At block 324, navigation instructions to the location of the selected customer 181 may be provided to the user 180 via the navigation system 224. At block 326 a description of the user's vehicle system 123 may be transmitted. This description of the vehicle system 123 may be used, for example, to generate a GUI such as the vehicle profile GUI 400 depicted in FIG. 4.

At block 328, a description of the user 180 may be transmitted. The description of the user 180 may describe the interests, hobbies or musical preferences of the user 180. The description of the user 180 may be used to generate a GUI such as the driver profile GUI 500 depicted in FIG. 5.

At block 330 the start of the paid journey may be determined. For example, the start of the paid journey may be determined to occur when the user 180 of the vehicle system 123 picks up the customer 181. At block 332 the end of the paid journey may be determined. For example, the end of the paid journey may be determined to occur when the user 180 of the vehicle system 123 drops off the customer 181. At block 334 the cost of the paid journey may be determined based on the start and end of the paid journey determined at blocks 330 and 332. In some implementations, the customer 181 pays the user 180 using the client 103 via an NFC module installed in the vehicle system 123. In this way, the customer may make an electronic payment to the user 180. The NFC module may be included under the touchscreen 290 of the vehicle system 123 so that the customer 181 may pay by tapping the client 103 to the touchscreen 290 of the vehicle system 123.

Referring now to FIG. 3D, at block 338 the time limit input may be received.

Block 340 may include monitoring for the user presence indicating the departure of the user 180 from the vehicle system 123. For example, a client 103 associated with the user 180 may pair with the vehicle system 123. The pairing may include the client 103 and the vehicle system 123 pairing via Bluetooth®, Bluetooth® LE or any other wireless protocol. This pairing may occur when the user 180 enters the vehicle system 123 or is in range of the Bluetooth antenna of the vehicle system 123. Responsive to the pairing, the onboard module 193 may determine that the user 180 is present at the vehicle system 123. Similarly, when the user 180 is outside the range of the Bluetooth antenna of the vehicle system 123 the onboard module 193 may determine that the user 180 is not present or has departed the vehicle system 123. In this way the presence of the user 180 may be determined by the onboard module 193. In some implementations, the presence of the customer 181 may be determined by the onboard module 193 in a similar way.

At block 342, a determination may be made regarding whether the user 180 has departed the vehicle system 123. If the determination indicates the user 180 has not departed, the method 300 may return to block 340. If the determination indicates the user 180 has departed, the method 300 may proceed to block 344.

At block 344 the geographic location of the vehicle system 123 and the time limit input for the vehicle system 123 may be transmitted. At block 346, the user profile data 191 may be secured. For example, the user profile data 191 may be encrypted or rendered inaccessible by any customer 181 or any other person who is not the user 180. At block 348 the customer profile data 192 may be received. For example, a customer 181 may have provided a selection indicating they will use the vehicle system 123 in accordance with a vehicle share service. The customer profile data 192 may be received so that the vehicle system 123 may be reconfigured in accordance with the preferences of the customer 181.

At block 350 the vehicle system 123 may be reconfigured in accordance with the customer profile data 192. Reconfiguring the vehicle system 123 in accordance with the customer profile data 192 is similar to reconfiguring the vehicle system 123 in accordance with the user profile data 191, and so that description will not be repeated here.

Figure 3E:
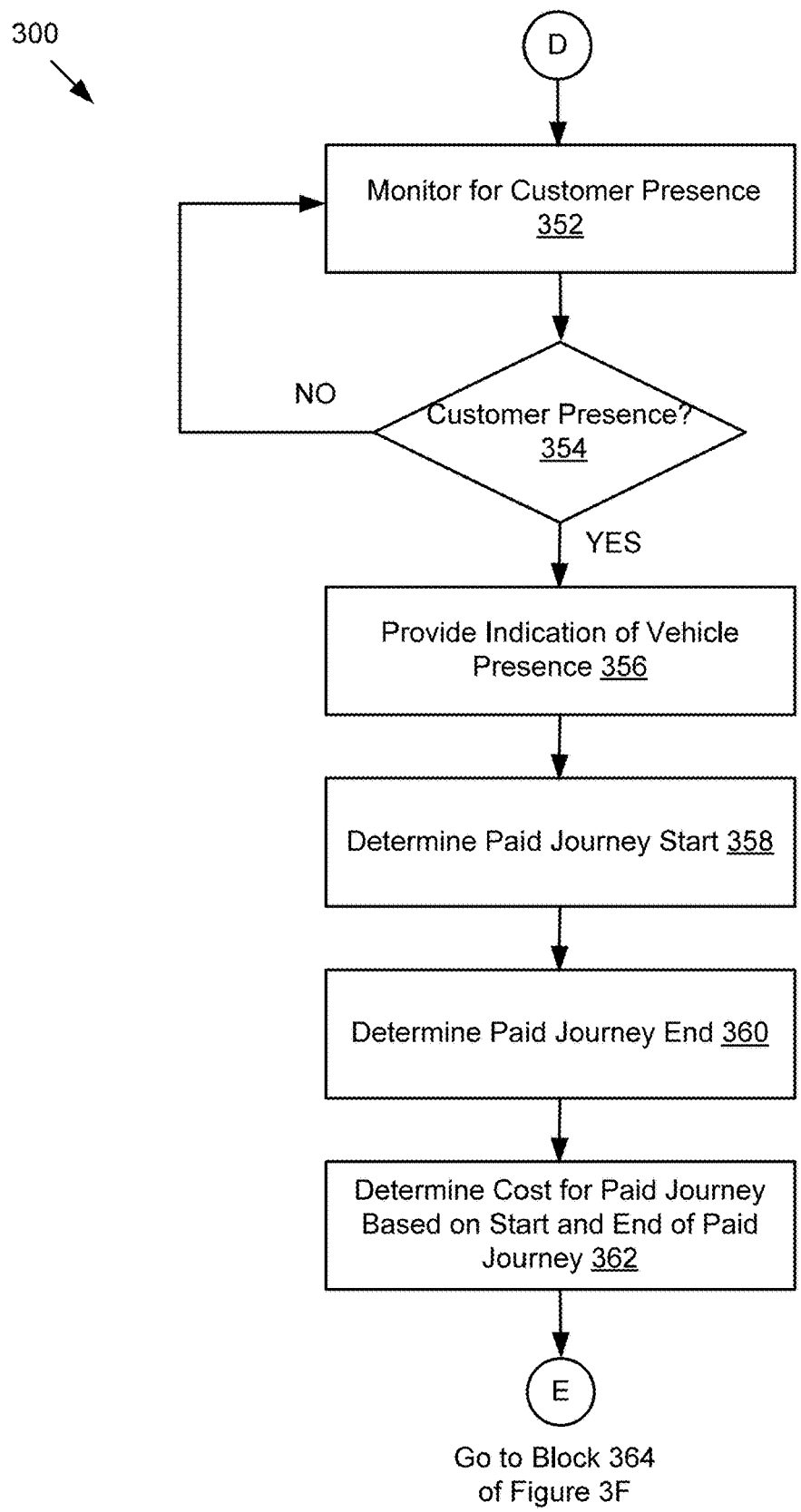

Referring now to FIG. 3E, block 352 may include monitoring for the presence of the customer 181. Monitoring for the presence of the customer 181 is similar to monitoring for the presence of the user 180 described above with reference to blocks 340 and 342, and so that description will not be repeated here. For example, since the vehicle system 123 may be configured with the customer profile data 192 including device pairings for the customer 181, the vehicle system 123 may pair with the client 103 of the customer 181 via Wi-Fi-, Bluetooth, Bluetooth LE, etc. In this way the presence of the customer 181 may be determined.

At block 354, the presence of the customer 181 may be determined. If the determination indicates that the customer 181 is not present, then method 300 may return to block 352. If the determination indicates that the customer 181 is present, then the method 300 may proceed to block 356.

At block 356, an indication of the location of the vehicle system 123 may be provided to the customer 181. For example, responsive to detecting the pairing of the client 103 and the vehicle system 123, the onboard module 193 of the vehicle system 123 may cause the headlights or brake lights of the vehicle system 123 to blink so that the user 180 may identify the location of the vehicle system 123. The blinking of the vehicle lights of the vehicle system 123 may be beneficial, for example, if the vehicle system 123 is among many other vehicle systems 123 in a parking lot and hard to identify among the other vehicle systems 123. In some implementations, GPS may be imprecise and the blinking of the vehicle lights may assist the user 180 to identify the vehicle system 123. The vehicle module 193 may be configured to sound a horn of the vehicle contemporaneous to blinking the vehicle lights.

In some implementations, the heads-up display unit 297 of the vehicle system 123 includes a graphical display panel configured to face outwards, i.e., facing outside the vehicle system 123 and away from the interior cabin so that the graphical display is viewable outside of the vehicle system 123. In some implementations, the outward facing graphical panel of the heads-up display unit 297 may be configured to display a personalized greeting for the customer 181 responsive to the onboard module 193 detecting the pairing of the vehicle system 123 and the client 103 via Bluetooth®. For example, the outward facing graphical panel may display a message similar to the personalized message described below with reference to FIG. 7. In this way, the indication of the location of the vehicle system 123 may be provided to the customer 181 at block 356.

At block 358 the start of the paid journey may be determined. For example, the start of the paid journey may be determined to occur when the customer 181 arrives at the vehicle system 123. At block 360 the end of the paid journey may be determined. For example, the end of the paid journey may be determined to occur when the customer 181 leaves the vehicle system 123, the presence of the customer 181 is no longer detected or the customer 181 provides an input to indicate the end of the journey. At block 362 the cost of the paid journey may be determined based on the start and end of the paid journey determined at blocks 358 and 360. In some implementations, the customer 181 pays the user 180 using the client 103 via an NFC module installed in the vehicle system 123. In this way, the customer may make an electronic payment to the user 180. The NFC module may be included under the touchscreen 290 of the vehicle system 123 so that the customer 181 may pay by tapping the client 103 to the touchscreen 290 of the vehicle system 123.

Figure 3F:
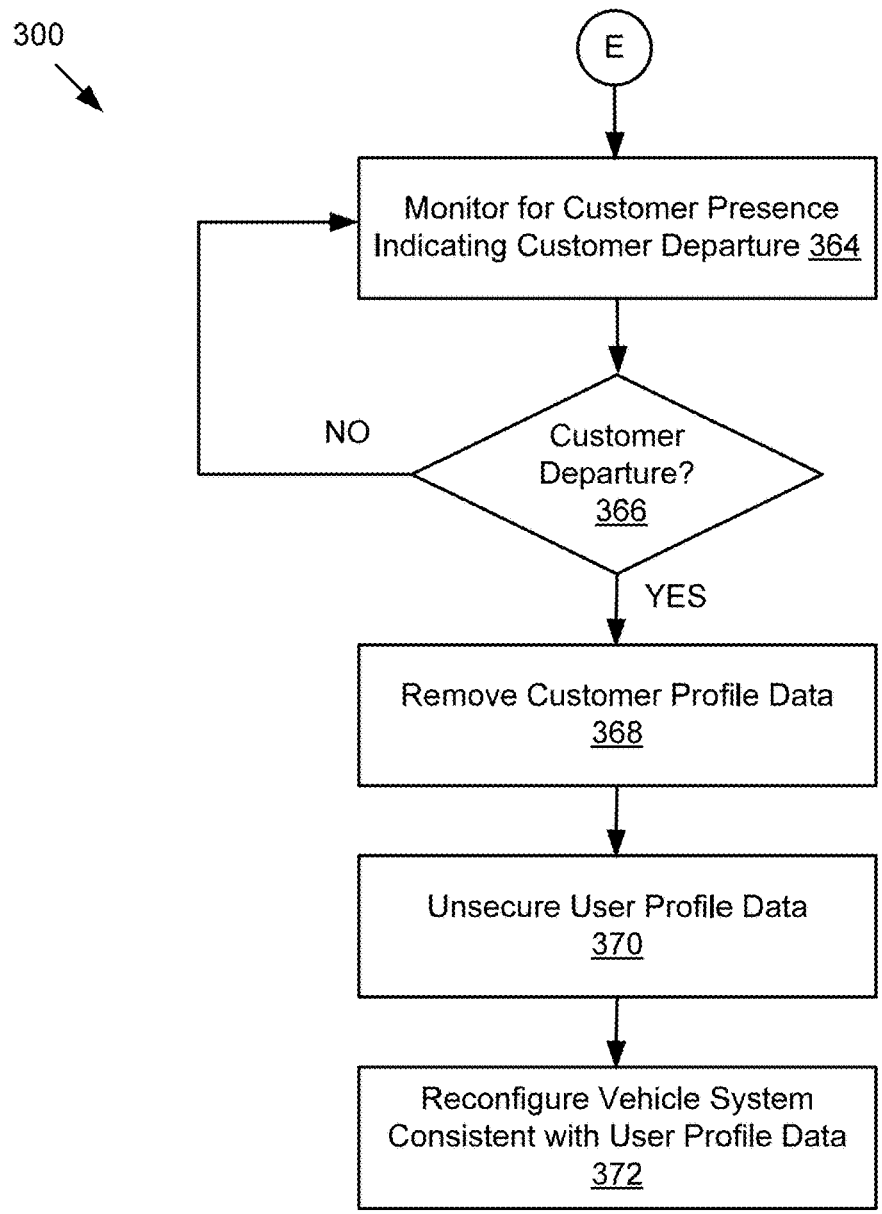

Referring now to FIG. 3F, block 364 includes monitoring for the departure of the customer 181. For example, the client 103 of the customer 181 may no longer be paired with the vehicle system 123, and this may indicate the departure of the customer 181.

At block 366 a determination may be made regarding whether the customer 181 has departed the vehicle system 123. If the determination indicates that the customer 181 has not departed, then the method 300 may return to block 364. If the determination indicates that the customer 181 has departed the vehicle system 123, then the method 300 may proceed to block 368.

At block 368 the customer profile data 192 may be deleted or removed from the vehicle system 123 including transmission to the market server 109 for synchronization with the client 103 of the customer 180. At block 370 the user profile data 191 may be unsecured for use by the vehicle system 123. At block 372, the vehicle system 123 may be reconfigured in accordance with the user profile data 191.

Figure 4:
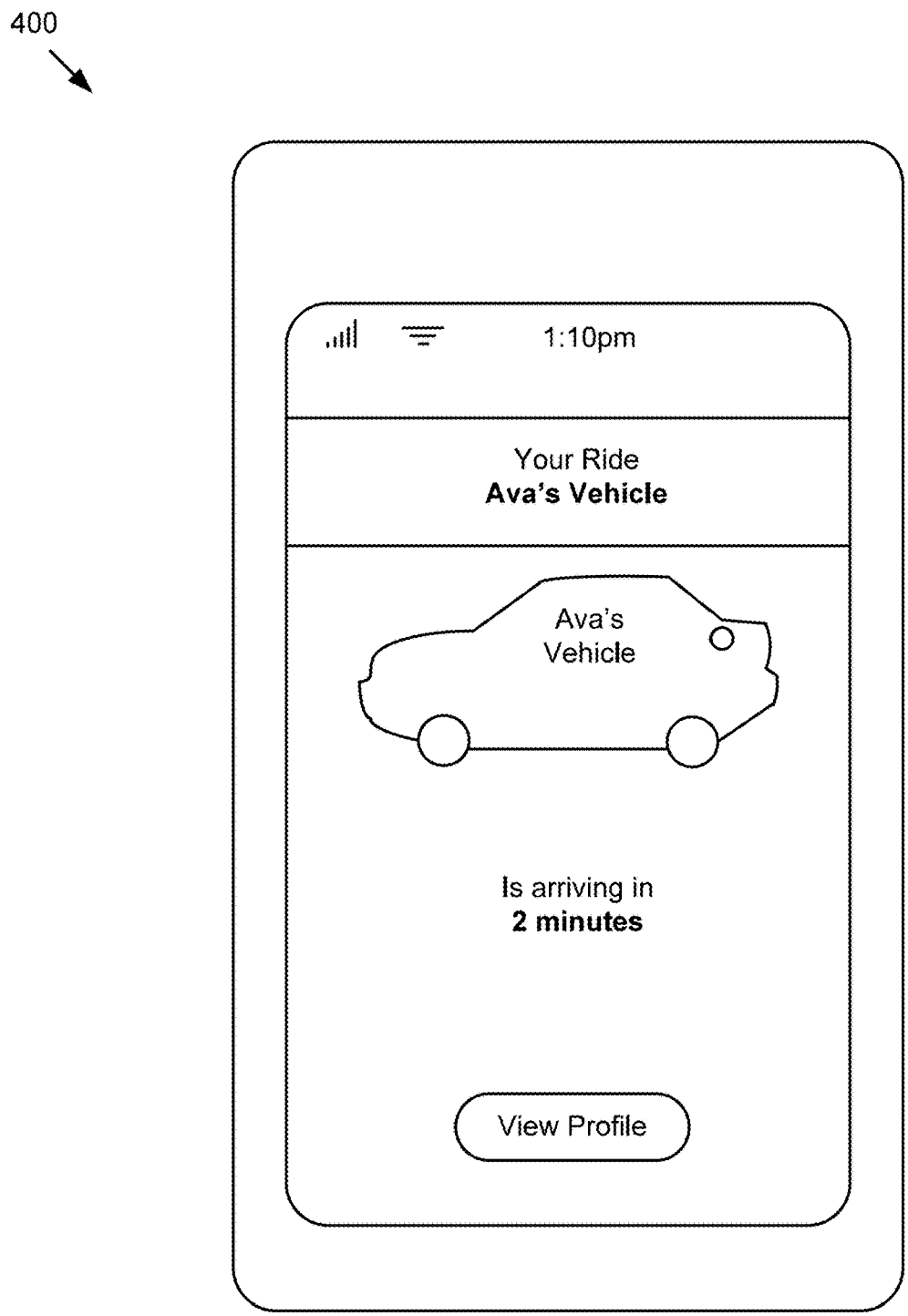
FIG. 4 is a graphic representation of a vehicle profile graphical user interface.

FIG. 4 is a graphic representation of a vehicle profile GUI 400. The vehicle profile GUI 400 may include a description of the vehicle system 123 for the user 180 and an estimate of the amount of time remaining before the user 180 arrives. The vehicle profile GUI 400 may be displayed on the touchscreen of the client 103 associated with the customer 181. The customer 181 may select the "View Profile" graphical element of the vehicle profile GUI 400. Responsive to the customer 181 selecting the "View Profile" graphical element, the customer module 198 may cause the touchscreen of the client 103 to display the driver profile GUI 500 described below with reference to FIG. 5.

FIG. 5 is a graphic representation of a driver profile GUI 500. The driver profile GUI 500 may include a description of the user 180 including the interest and musical tastes of the user 180 as determined by one or more of the social profile data and network services data of the user 180. The driver profile GUI 500 may be displayed on the touchscreen of the client 103 associated with the customer 181.

Figure 6A:
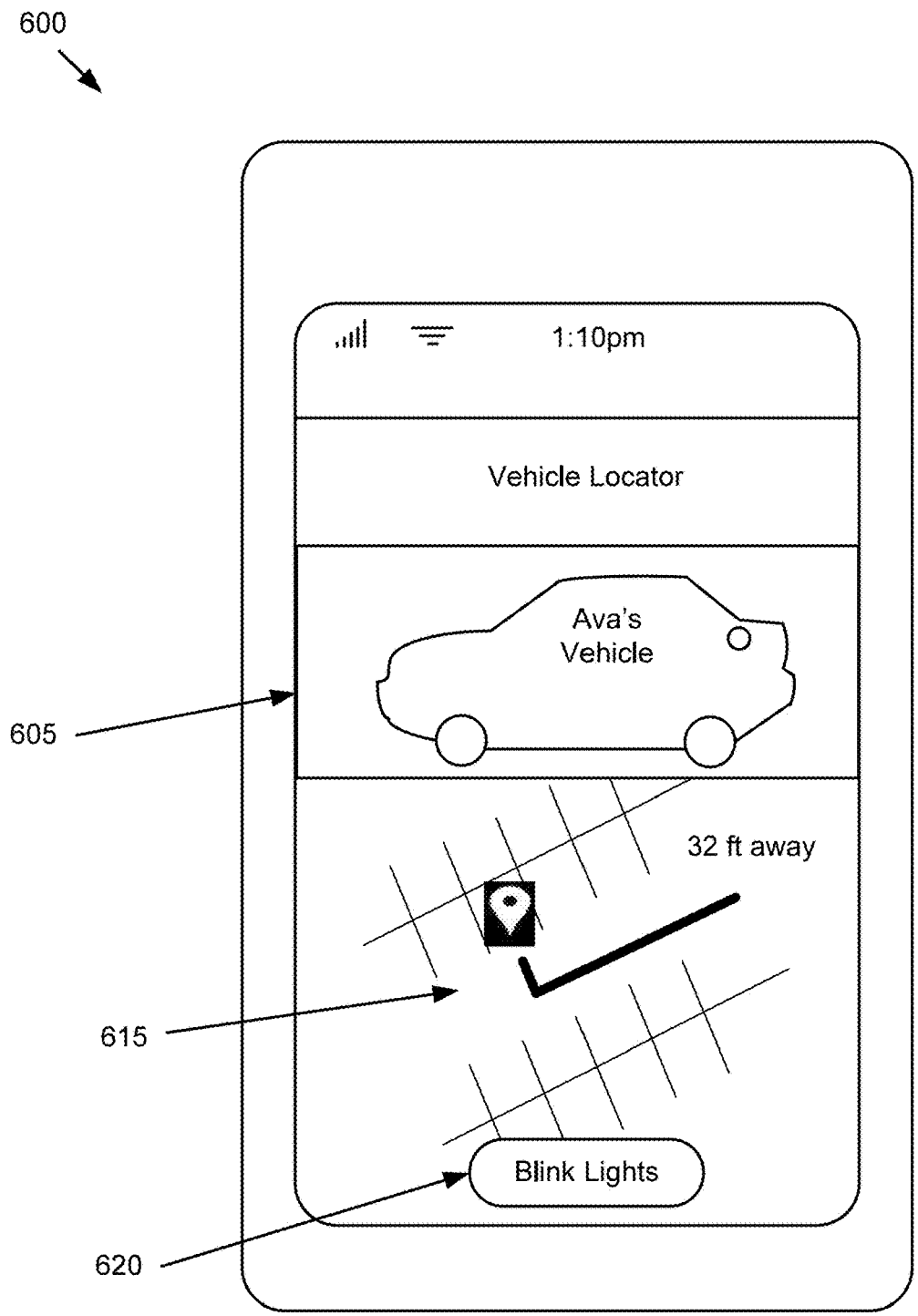
FIGS. 6A and 6B are a graphic representation of a vehicle locator graphical user interface.
Figure 6B:
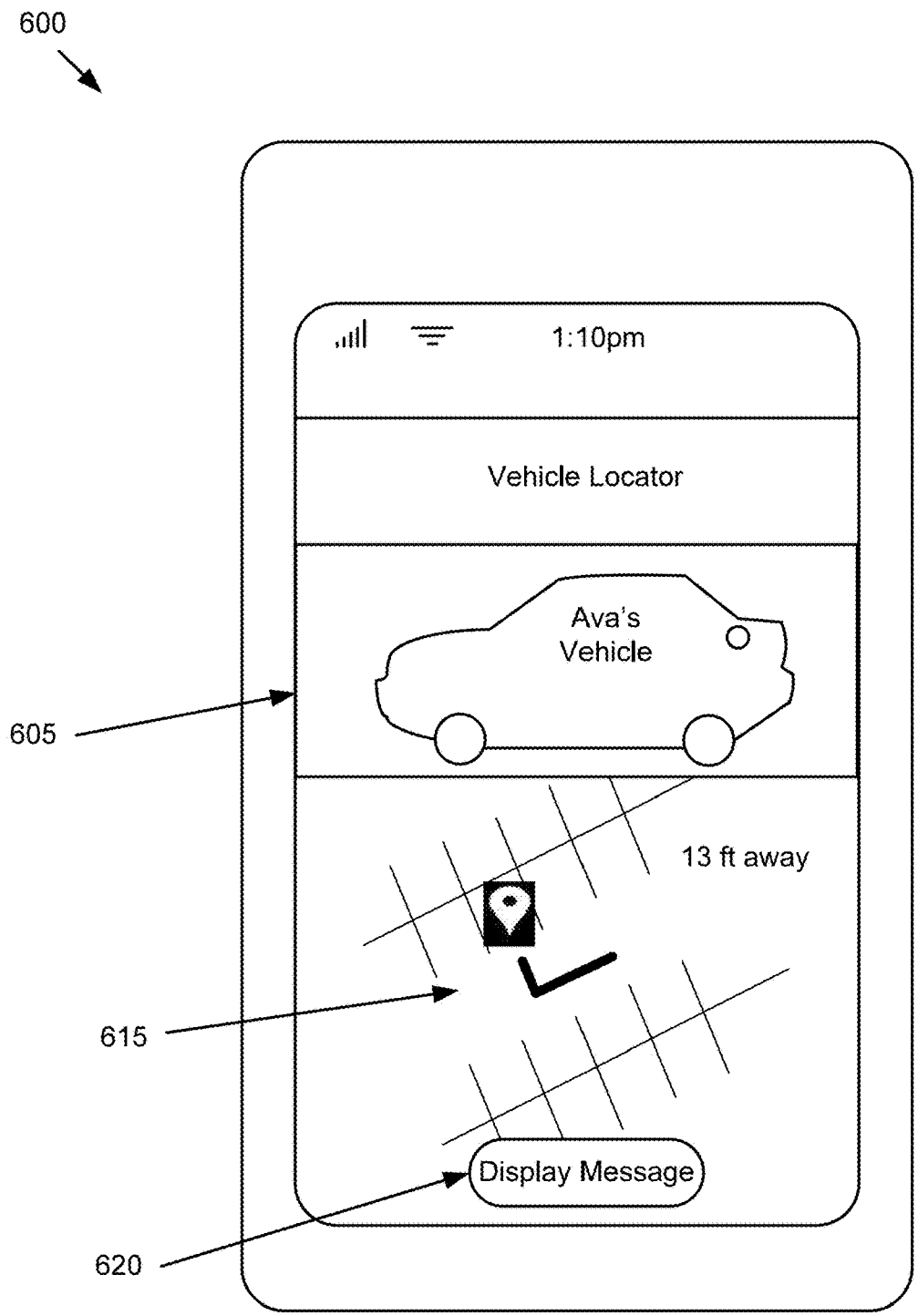

FIGS. 6A and 6B are a graphic representation of a vehicle locator GUI 600.

Referring to FIG. 6A, graphical element 605 may display a graphical depiction of the vehicle system 123 associated with the user 180. For example, assume that "Elizabeth" is a customer 181 who has agreed to pay to use a vehicle system 123 associated with a user 180 named "Ava" as part of a vehicle share service. For example, Ava may have placed the vehicle system 123 in Share Vehicle mode and Elizabeth may have selected to use the vehicle system 123 in exchange for a payment.

The vehicle locator GUI 600 may be displayed on a client 103 associated with Elizabeth. Further assume that Elizabeth is attempting to locate Ava's vehicle system 123 using the vehicle locator GUI 600 displayed on the touchscreen of the client 103. Graphical element 615 may display a real time or near real time indication of how far the client 103 is from the vehicle system 123. For example, the client 103 may be a smartphone associated with Elizabeth. Elizabeth may be looking for the vehicle system 123 using the vehicle locator GUI 600. In this example, graphical element 615 may indicate that the client 103 is 32 feet away from the vehicle system 123.

Graphical element 615 may display an electronic map that depicts the relative location of the vehicle system 123 and the client 103 and a path that may be taken by the customer 181 in order to locate the vehicle system 123. Graphical element 615 may be updated in real time or near real time. For example, with reference to FIG. 6B, graphical element 615 may be updated in FIG. 6B to indicate that the client 103 is 13 feet away from the vehicle system 123.

Referring back to FIG. 6A, graphical element 620 may be a graphical button selectable by the customer 181 to configure whether the vehicle system 123 will blink its lights or display a message on the outward facing graphical panel. In this example the graphical element 620 is configured so that the vehicle system 123 will blink its lights when the client 103 pairs with the vehicle system 123.

Referring to FIG. 6B, the graphical element 620 in this example shows that the customer 181 has selected to receive a message on the outward facing graphical panel. The customer module 198 may transmit the selection of the customer 181 to the vehicle system 123 via the network 105 so that the onboard module 193 takes action corresponding to the selection.

Figure 7:
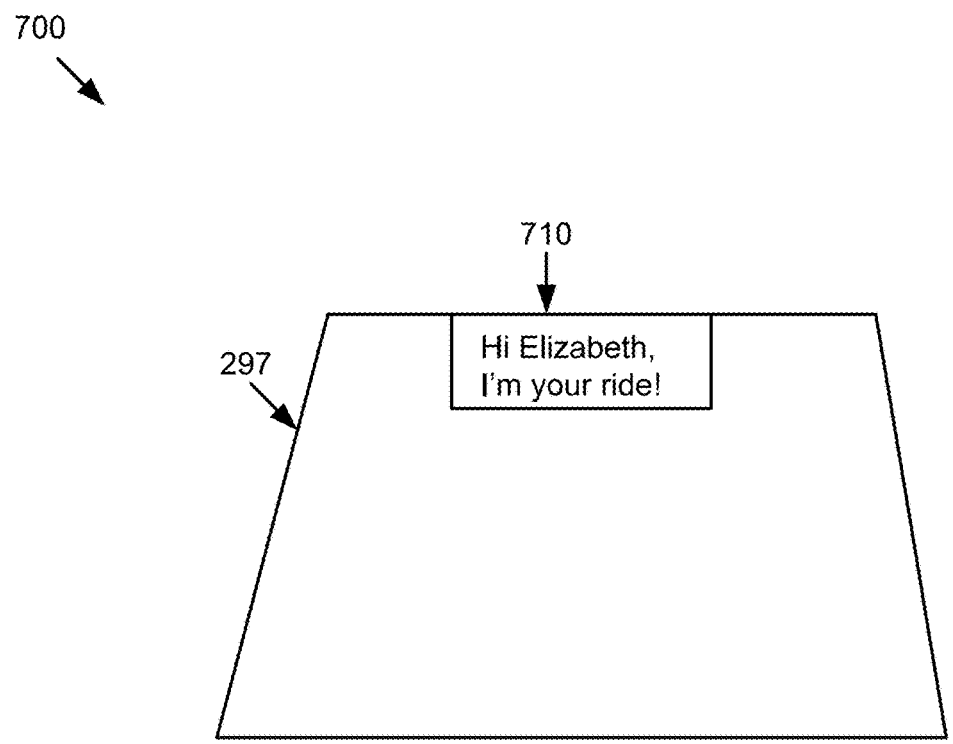
FIG. 7 is a block diagram of an outward facing display panel of a heads-up display unit.

FIG. 7 is a block diagram of an outward facing display panel 710 of a heads-up display unit 297. The heads-up display unit 297 was described above with reference to FIG. 2, and so that description will not be repeated here. The outward facing display panel 710 may be an optional feature of the heads-up display unit 297 installed in a windshield of the vehicle system 123.

Figure 8:
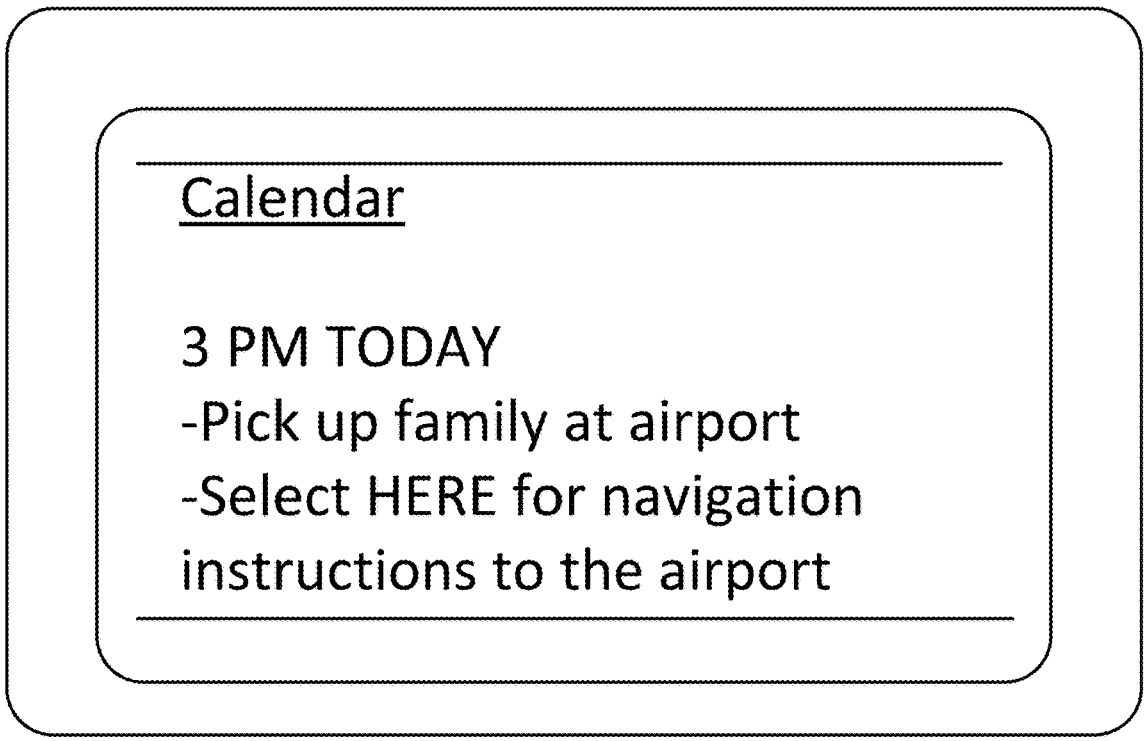
FIG. 8 is a graphic representation of a calendar graphical user interface.

FIG. 8 is a graphic representation of a calendar GUI 800. The calendar GUI 800 may be displayed, for example, on a touchscreen 290 of the vehicle system 123. The calendar GUI 800 may be personalized for the customer 181 using the vehicle system 123 as part of the onboard vehicle share service of the onboard vehicle sharing system 200. For example, Ava may have placed the vehicle system 123 in Share Vehicle mode and Elizabeth may have selected to use the vehicle system 123 in exchange for a payment.

The calendar GUI 800 may display one or more electronic calendars associated with the network services for the customer 181 based on the customer profile data 192. The calendar GUI 800 may be configured to include graphical elements that are selectable by the customer 181 by touching the touchscreen 290. For example, in the depicted example of FIG. 8, the customer 181 may select a portion of the calendar GUI 800 to receive navigation instructions to the airport, which may be context specific to the calendar entry "Pick up family at airport." In this way the onboard module 193 includes code and routines configured to determine and generate context specific navigation instructions for the calendar GUI 800 based on the customer profile data 192 including data describing a calendar entry for the customer 181.

Figure 9:
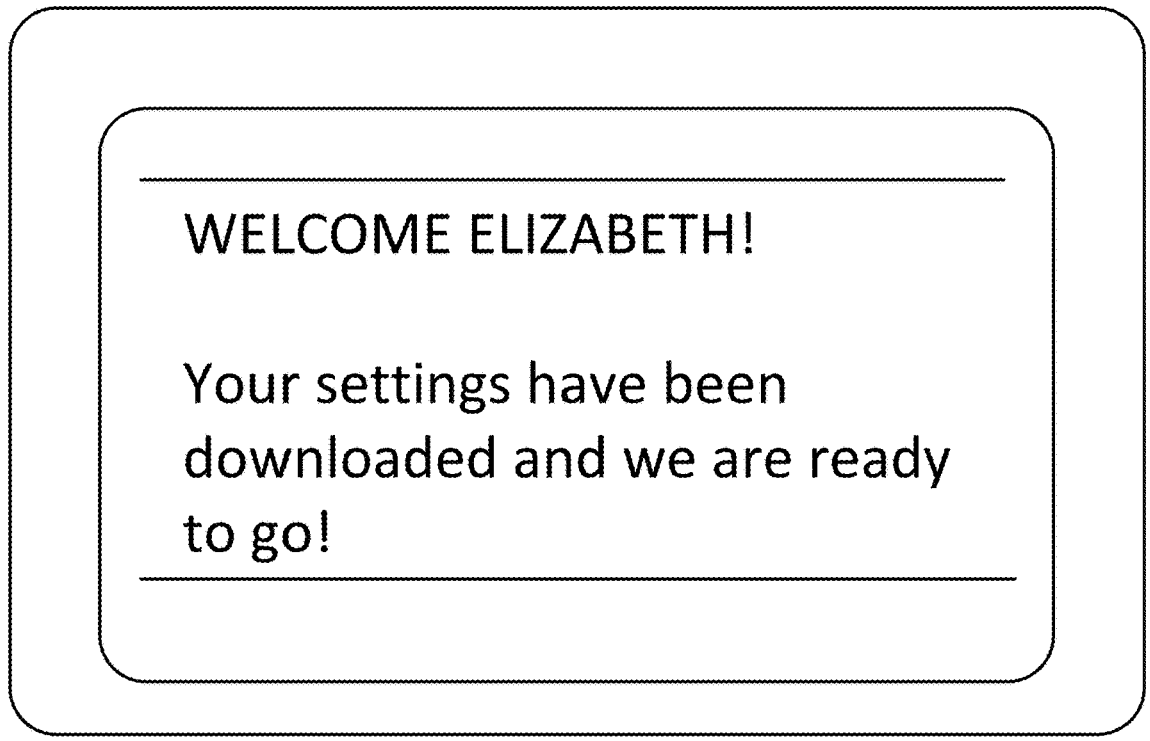
FIG. 9 is a graphic representation of a personalized welcome graphical user interface.

FIG. 9 is a graphic representation of a personalized welcome GUI 900. The personalized welcome GUI 900 may be displayed, for example, on a touchscreen display of the vehicle system 123 or the outward facing panel of the heads-up display unit 297. The personalized welcome GUI 900 may be personalized for the customer 181 using the vehicle system 123 in association with the vehicle system 123 being in Share Vehicle mode. For example, the personalized welcome GUI 900 may display the name of the customer 181 based on the customer profile data 192.

FIG. 10 is a graphic representation of a revenue summary GUI 1000. The revenue summary GUI 1000 may describe the revenue for the user 180 as a result of placing the vehicle system 123 in one or more of Share Ride mode or Share Vehicle mode.

FIG. 11 is a graphic representation of a customer summary GUI 1100. For example, the user 180 may have placed the vehicle system 123 in Share Ride mode and the customer summary GUI 1100 may be displayed on the touchscreen 290 of the vehicle system 123 in accordance with block 320 described above with reference to FIG. 3B.

The implementations of the specification can also relate to an apparatus for performing the operations described herein. This apparatus may be specially constructed for the required purposes, or it may include a special-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a stand-alone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
   an onboard vehicle sharing system installed in a vehicle, the onboard vehicle sharing system comprising:
   a processor; and
   a non-transitory computer-readable medium communicatively coupled to the processor, the non-transitory computer-readable medium having computer instructions stored thereon that are executable by the processor to perform operations comprising:
   receiving an input from a driver of the vehicle indicating that the vehicle is switched from a private mode to a share ride mode;
   displaying a graphical user interface to the driver of the vehicle, the graphical user interface describing a geographic location of a set of customers relative to one another and relative to the vehicle while the customers are outside the vehicle and which ride share service is being used by the customers;
   determining that a client associated with a current customer from the set of customers wirelessly pairs with the onboard vehicle sharing system; and
   responsive to the client wirelessly pairing with the onboard vehicle sharing system, (1) reconfiguring the vehicle for the current customer based on customer profile data associated with the current customer and (2) modifying one or more motors of the vehicle.

2. The system of claim 1, further comprising an outward facing graphical heads-up display unit configured to display a greeting for the current customer.

3. The system of claim 1, wherein the graphical user interface further includes an option to view profits for a time period earned by the driver.

4. The system of claim 1, wherein the customer profile data is used to enable the current customer to access electronic services in the vehicle that include at least one of navigation instructions, streaming audio or video, social networking, microblogging, online content sharing, email, file sharing, or electronic calendar and scheduling.

5. The system of claim 1, wherein the set of customers includes one or more suggested customers selected from a larger group of customers, wherein the one or more suggested customers are selected based on social network data indicating that the selected customers have a relationship to the driver of the vehicle.

6. The system of claim 1, wherein modifying the one or more motors of the vehicle includes changing one or more of a seat, a steering wheel, or a mirror.

7. The system of claim 1, wherein the set of customers includes one or more suggested customers selected from a larger group of customers, wherein the one or more suggested customers are selected based on one or more network services indicating that the selected customers have similar music interests that are related to the driver of the vehicle.

8. The system of claim 7, wherein the similar music interests of the driver are determined based on music presented to the driver in the vehicle via the one or more network services.

9. A method comprising:
receiving, by an onboard vehicle sharing system installed in a vehicle, an input from a driver of the vehicle indicating that the vehicle is switched from a private mode to a share ride mode;
displaying a graphical user interface to the driver of the vehicle, the graphical user interface describing a geographic location of a set of customers relative to one another and relative to the vehicle, wherein the graphical user interface includes an indication of a ride sharing service associated with at least one of the customers in the set of customers while the customers are outside the vehicle and which ride share service is being used by the customers;
determining that a client associated with a current customer from the set of customers wirelessly pairs with an onboard vehicle sharing system of the vehicle; and
responsive to the client wirelessly pairing with the onboard vehicle sharing system, (1) reconfiguring the vehicle for the current customer based on customer profile data associated with the current customer and (2) modifying one or more motors of the vehicle.

10. The method of claim 9, the graphical user interface further includes one or more interests or one or more music tastes associated with a customer from the set of customers.

11. The method of claim 9, wherein the graphical user interface further includes an indication of the ride sharing service associated with each customer in the set of customers.

12. The method of claim 11, wherein there are two or more customers in the set of customers, a first customer is associated with a first ride sharing service and a second ride sharing service, and a different customer is associated with the second ride sharing service that is different from the first ride sharing service.

13. The method of claim 9, wherein the set of customers includes one or more suggested customers selected from a larger group of customers, wherein the one or more suggested customers are selected based on social network data indicating that the selected customers have a relationship to the driver of the vehicle.

14. The method of claim 13, wherein the relationship is a similar interest.

15. The method of claim 9, wherein the set of customers includes one or more suggested customers selected from a larger group of customers, wherein the one or more suggested customers are selected based on one or more network services indicating that the selected customers have similar music interests that are related to the driver of the vehicle.

16. The method of claim 15, wherein the similar music interests of the driver are determined based on music presented to the driver in the vehicle via the one or more network services.

17. A non-transitory computer-readable medium having computer instructions stored thereon that are executable by a processing device to perform operations, the operations comprising:
receiving an input from a driver of a vehicle indicating that the vehicle is switched from a private mode to a share ride mode;
displaying a graphical user interface to the driver of the vehicle, the graphical user interface describing a geographic location of a set of customers relative to one another and relative to the vehicle while the customers are outside the vehicle and which ride share service is being used by the customers;
determining that a client associated with a current customer from the set of customers wirelessly pairs with an onboard vehicle sharing system of the vehicle; and
responsive to the client wirelessly pairing with the onboard vehicle sharing system, (1) reconfiguring the vehicle for the current customer based on customer profile data associated with the current customer and (2) modifying one or more motors of the vehicle.

18. The non-transitory computer-readable medium of claim 17, wherein the graphical user interface further includes one or more interests or one or more music tastes associated with a customer from the set of customers.

19. The non-transitory computer-readable medium of claim 17, wherein the graphical user interface further includes an indication of one or more ride sharing services associated with each customer in the set of customers.

20. The non-transitory computer-readable medium of claim 19, wherein there are two or more customers in the set of customers, a first customer is associated with a first ride sharing service and a second ride sharing service, and a different customer is associated with the second ride sharing service that is different from the first ride sharing service.

* * * * *